US012125338B2

(12) United States Patent
Wortmann et al.

(10) Patent No.: US 12,125,338 B2
(45) Date of Patent: Oct. 22, 2024

(54) GAMING MACHINE WITH ACCUMULATING WILD FEATURE

(71) Applicant: Games Global Operations Limited, Douglas (IM)

(72) Inventors: Jonathan Bruce Wortmann, Cowies Hill (ZA); Richard Vermaak, Durban (ZA); Terence Igesund, Prestondale (ZA)

(73) Assignee: Games Global Operations Limited, Douglas (IM)

( * ) Notice: Subject to any disclaimer, the term of this patent is extended or adjusted under 35 U.S.C. 154(b) by 1402 days.

(21) Appl. No.: 14/629,458

(22) Filed: Feb. 23, 2015

(65) Prior Publication Data

US 2015/0248811 A1 Sep. 3, 2015

(30) Foreign Application Priority Data

Mar. 3, 2014 (GB) ..................................... 1403704

(51) Int. Cl.
*A63F 9/24* (2006.01)
*G07F 17/32* (2006.01)
*G07F 17/34* (2006.01)

(52) U.S. Cl.
CPC .......... *G07F 17/3213* (2013.01); *G07F 17/32* (2013.01); *G07F 17/34* (2013.01)

(58) Field of Classification Search
CPC ....... G07F 17/32; G07F 17/34; G07F 17/3213
USPC ............................................................ 463/20
See application file for complete search history.

(56) References Cited

U.S. PATENT DOCUMENTS 6,517,432 B1 * 2/2003 Jaffe ........................ G07F 17/32 463/16
7,195,559 B2 3/2007 Gilmore et al.
8,602,867 B2 12/2013 Owen et al.
8,734,222 B2 5/2014 Owen et al.
(Continued)

FOREIGN PATENT DOCUMENTS

WO WO 2010/043256 A1 4/2010

OTHER PUBLICATIONS

Australian Patent Office, Patent Examination Report No. 1 for Application No. 2015200461, mailed Feb. 9, 2016, 3 pages.
(Continued)

*Primary Examiner* — Lawrence S Galka
(74) *Attorney, Agent, or Firm* — McDonnell Boehnen Hulbert & Berghoff LLP

(57) ABSTRACT

An example method includes determining, for a first outcome event, a first symbol set to display within a symbol-display-portion of a display of the machine; displaying, by the display for the first outcome event, the first symbol set; determining, by the machine for a second outcome event occurring after the first outcome event, a second symbol set to display within the symbol-display-portion of the display; determining, by the machine for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

23 Claims, 21 Drawing Sheets

(56) References Cited

U.S. PATENT DOCUMENTS

| | | | | |
|---|---|---|---|---|
| 8,827,796 | B2 | 9/2014 | Vermaak et al. | |
| 2004/0033827 | A1* | 2/2004 | Gilmore | G07F 17/3244 463/20 |
| 2004/0048646 | A1* | 3/2004 | Visocnik | G07F 17/32 463/16 |
| 2004/0116174 | A1* | 6/2004 | Baerlocher | G07F 17/32 463/16 |
| 2005/0075158 | A1 | 4/2005 | Walker et al. | |
| 2005/0119041 | A1* | 6/2005 | Berman | G07F 17/32 463/16 |
| 2008/0108411 | A1 | 5/2008 | Jensen et al. | |
| 2008/0188279 | A1 | 8/2008 | Seelig et al. | |
| 2008/0318659 | A1 | 12/2008 | Hosokawa | |
| 2009/0191950 | A1* | 7/2009 | Shai-Hee | G07F 17/32 463/20 |
| 2009/0239632 | A1* | 9/2009 | Leupp | G07F 17/3265 463/20 |
| 2010/0197377 | A1* | 8/2010 | Aoki | G07F 17/32 463/20 |
| 2013/0017881 | A1 | 1/2013 | Watkins | |
| 2013/0184046 | A1 | 7/2013 | Vermaak et al. | |
| 2013/0252708 | A1 | 9/2013 | Englman et al. | |
| 2015/0080094 | A1* | 3/2015 | Edwards | G07F 17/326 463/20 |
| 2015/0170461 | A1 | 6/2015 | Berman et al. | |
| 2015/0170462 | A1 | 6/2015 | Berman et al. | |
| 2015/0206383 | A1 | 7/2015 | Berman et al. | |
| 2015/0287269 | A1 | 10/2015 | Berman | |

OTHER PUBLICATIONS

Australian Patent Office, Patent Examination Report No. 2 for Application No. 2015200461, mailed Jul. 6, 2016, 3 pages.

European Patent Office, Munich Germany, European Search Report, Application No. EP 15157465, mailed Jul. 13, 2015, 7 pages.

U.S. Appl. No. 14/629,448, filed Feb. 23, 2015; inventors: Wortmann, Jonathan Bruce; Vermaak, Richard; and Igesund, Terence.

Communication pursuant to Article 94(3) EPC for European Patent Application No. 15 157 465.4-1222 dated Feb. 1, 2019.

* cited by examiner

GAMING MACHINE WITH ACCUMULATING WILD FEATURE

PRIORITY

This application claims priority under 35 U.S.C. § 119 to United Kingdom Patent Application No. 1403704.8 filed Mar. 3, 2014. United Kingdom Patent Application No. 1403704.8 is hereby incorporated by reference in its entirety.

BACKGROUND

This disclosure relates to gaming machines for playing games such as wager games.

Wager games come in a variety of forms including, for example, a mechanical slot machine. A mechanical slot machine may include one or more reels, each of which includes multiple symbols distributed around the circumference of the reel. When a player places a wager (e.g., by placing a coin in the machine), the player is allowed to spin the reels. Each reel then comes to rest, typically with either one of the symbols, or a space in between symbols, in alignment with a pay line. A predefined winning symbol or a predefined winning combination of symbols that are aligned with the pay line can result in the player winning the game and receiving a payout. In one example, the machine may include three reels, and the pay line may be a horizontal line disposed across a centre of each of the three reels.

In another example of a wager game, a mechanical slot machine may present symbols in a matrix arrangement, with each symbol changing during a spin of the game. For example, the machine may have five columns and three rows of symbols, for a total of fifteen symbols. Such machines often have multiple pay lines, each being defined by a collection of positions within the matrix. For example, the machine may have three pay lines, each corresponding to one row of the matrix.

While slot machines were traditionally mechanical, modern slot machines often take the form of a video gaming machine (e.g., a dedicated gaming machine located in a casino) that includes a graphical user interface (GUI), and that may emulate a mechanical slot machine. With a video gaming machine, the GUI may include a display that displays an image of one or more reels or a matrix as described above, together with animation effects to simulate a spin of the one or more reels, or a spin of the columns or rows of the matrix. A computer software program, which may reside in the video gaming machine, may randomly select one or more symbols in response to a spin, and may display the selected one or more symbols on the display.

A modern slot machine may also be played over a computer network, such as by a player using a client machine that is connected to a server machine over the computer network. In this instance, the server machine may perform the spins of the game and may send the resulting symbols to the client machine for display.

The popularity of video slot games has increased due to the incorporation of a "wild" symbol into such video slot games. A wild symbol, which is usually the highest-ranking symbol of the game, offers line payouts just like any other symbol and, additionally, substitutes for any other symbol in the game, thereby assisting in making winning results and providing a player with entertainment and additional opportunities to win games.

In many conventional video slot games, wild symbols may (or may not) be randomly selected from a global symbol set stored in memory, and then, if selected, may be displayed as one of several symbols that appear on a pay line of a virtual reel for an outcome event. Typically, all symbols displayed for a first outcome event, including wild symbols, are removed so that an entirely new symbol set can be selected and displayed for a second outcome event.

OVERVIEW

Viewed from one aspect, the disclosure provides a method comprising: determining, by a machine for a first outcome event, a first symbol set to display within a symbol-display-portion of a display of the machine, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the machine for a second outcome event occurring after the first outcome event, a second symbol set to display within the symbol-display-portion of the display, wherein each symbol of the second symbol set is randomly selected from the global symbol set; determining, by the machine for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Viewed from a second aspect, the disclosure provides a machine comprising: a display configured to display symbols in a wager outcome event; a processor; and a non-transitory computer-readable medium storing program instructions, that when executed by the processor, cause a set of functions to be performed, the set of functions comprising: determining, by the processor for a first outcome event, a first symbol set to display within a symbol-display-portion of the display, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the processor for a second outcome event occurring after the first outcome event, a second symbol set to display within the symbol-display-portion of the display, wherein each symbol of the second symbol set is randomly selected from the global symbol set; determining, by the processor for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Viewed from a third aspect, the disclosure provides a non-transitory computer-readable medium storing program instructions, that when executed by a computing device, cause a set of functions to be performed, the set of functions comprising: determining, by the computing device for a first outcome event, a first symbol set to display within a symbol-display-portion of a display of the machine, wherein the first symbol set includes multiple symbols randomly selected from a global symbol set, and wherein the multiple symbols randomly selected from the global symbol set include at least one instance of a particular symbol randomly selected from the global symbol set; displaying, by a display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the computing device for a second outcome event occurring after the first outcome event, a second symbol set to display within the symbol-display-portion of the display, wherein each symbol of the second symbol set is randomly selected from the global symbol set; determining, by the computing device for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Viewed from a fourth aspect, the disclosure provides a method comprising: determining, by a server machine for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by the server machine to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the server machine for a second outcome event occurring after the first outcome event, a second symbol set to display within the symbol-display-portion of the display, wherein each symbol of the second symbol set is randomly selected from the global symbol set; determining, by the server machine for the second outcome event, for each instance of the particular symbol in the first symbol set, a corresponding second symbol position in the symbol-display-portion of the display; and sending, by the server machine to the client machine, for the second outcome event, second data for displaying each instance of the particular symbol in the first symbol set randomly selected for the first outcome event at the corresponding second symbol position and each symbol of the second symbol set within the symbol-display-portion of the display.

Viewed from a fifth aspect, the disclosure provides a server machine comprising: a processor, a communication interface, and a non-transitory computer-readable medium storing software instructions, that when executed by the processor, perform a set functions, wherein the set of functions comprise: determining, by the processor for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by the communication interface to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the processor for a second outcome event occurring after the first outcome event, a second symbol set to display within the symbol-display-portion of the display, wherein each symbol of the second symbol set is randomly selected from the global symbol set; determining, by the processor for the second outcome event, for each instance of the particular symbol in the first symbol set, a corresponding second symbol position in the symbol-display-portion of the display; and sending, by the communication interface to the client machine, for the second outcome event, second data for displaying each instance of the particular symbol in the first symbol set randomly selected for the first outcome event at the corresponding second symbol position and each symbol of the second symbol set within the symbol-display-portion of the display.

Viewed from a sixth aspect, the disclosure provides a non-transitory computer-readable medium storing program instructions, that when executed by a server machine, cause a set of functions to be performed, the set of functions comprising: determining, by the server machine for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by the server machine to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the server machine for a second outcome event occurring after the first outcome event, a second symbol set to display within the symbol-display-portion of the display, wherein each symbol of the second symbol set is randomly selected from the global symbol set; determining, by the server machine for the second outcome event, for each instance of the particular symbol in the first symbol set, a corresponding second symbol position in the symbol-display-portion of the display; and sending, by the server machine to the client machine, for the second outcome event, second data for displaying each instance of the particular symbol in the first symbol set randomly selected for the first outcome event at the corresponding second symbol position and each symbol of the second symbol set within the symbol-display-portion of the display.

Viewed from a seventh aspect, the disclosure provides a method comprising: receiving, by a client machine for a first outcome event, first data for displaying within a symbol-display-portion of a display of the client machine, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the client machine for the second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Viewed from a eighth aspect, the disclosure provides a client machine comprising: a processor, a display, a communication interface, and a non-transitory computer-readable medium storing software instructions, that when executed by the processor, perform a set functions, wherein the set of functions comprise: receiving, by the communication interface for a first outcome event, first data for displaying within a symbol-display-portion of the display, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the communication interface for a second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Viewed from a ninth aspect, the disclosure provides a non-transitory computer-readable medium storing program instructions, that when executed by a client machine, cause a set of functions to be performed, the set of functions comprising: receiving, by a client machine for a first outcome event, first data for displaying within a symbol-display-portion of a display of the client machine, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the client machine for the second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

In embodiments of the disclosure in which a computer software product is used, the product may be non-transitory and store instructions on physical media such as a DVD, or a solid state drive, or a hard drive. Alternatively, the product may be transitory and in the form of instructions provided over a connection such as a network connection which is linked to a network such as the Internet.

DESCRIPTION OF THE FIGURES

Some embodiments of the disclosure will now be described by way of example and with reference to the accompanying drawings.

DETAILED DESCRIPTION

I. Introduction

Figure 1:
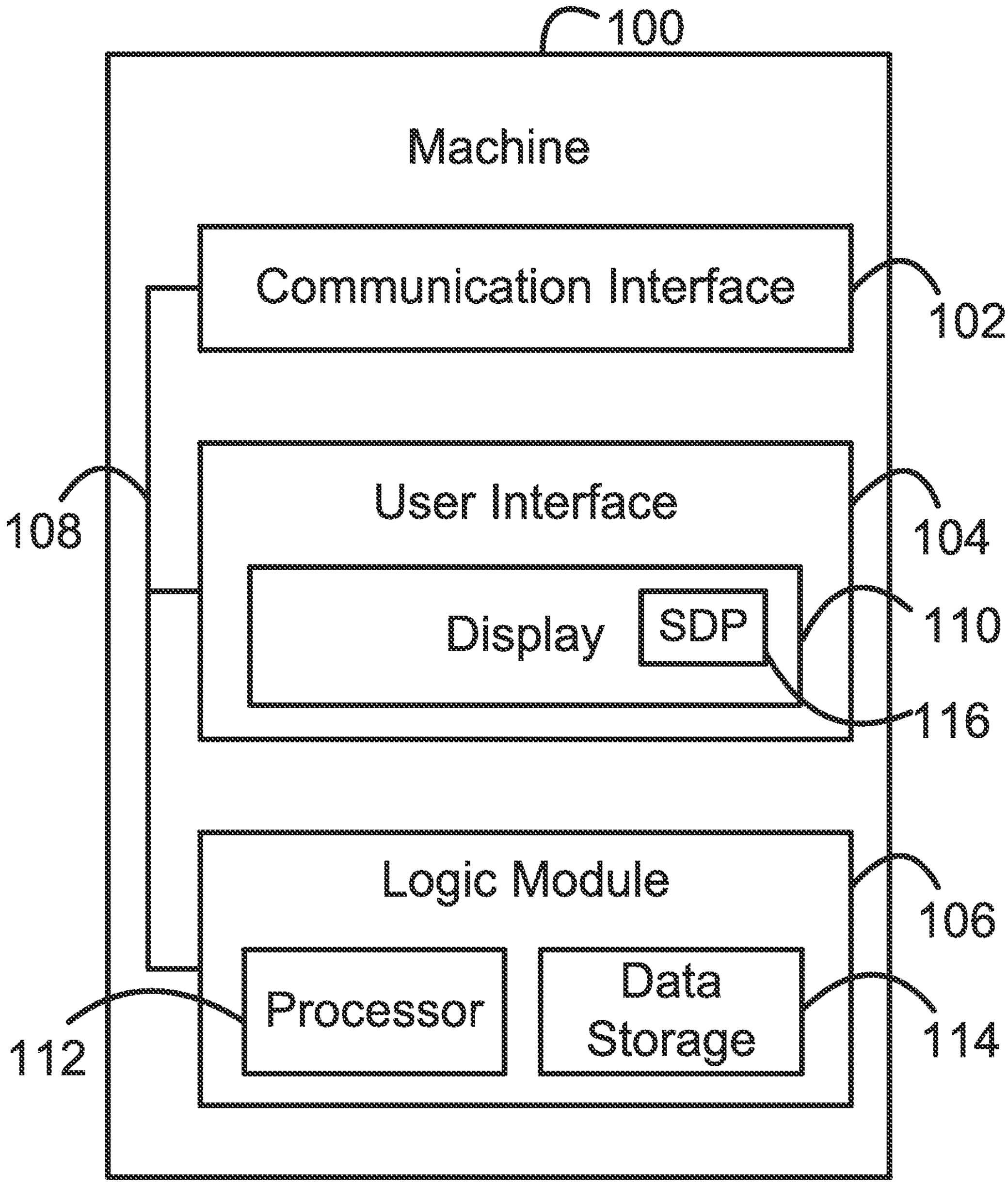
FIG. 1 is a simplified block diagram of an embodiment of a machine in accordance with the disclosure.

This description describes several example embodiments including, but not limited to, example embodiments pertaining to performing aspects of an outcome event using a machine. Performing the outcome event can include playing a game. The machine can display a variety of symbols during performance of an outcome event. A displayed symbol can be a particular symbol that is displayed at a symbol position within a symbol-display-portion of a display during an outcome event and that persists for one or more subsequent plays of the game.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The example embodiments refer to various outcome events, such as a first outcome event and a second outcome event. In one case, one or more intervening outcome events can occur between two outcome events such as one or more intervening outcome events between the first outcome event and the second outcome event. In another case, there may be no intervening outcome events between two outcome events, such as the first outcome event and the second outcome event. In some cases, the intervening outcome event(s) do not display any new instances of a particular symbol. In other cases, one or more of the intervening outcome events can include displaying a new instance of the particular symbol. For purpose of this description, the terms "multiple" and "a plurality of" refer to "two or more" or "more than one."

Disclosed herein are machines and methods for carrying out aspects of outcome events that include displaying symbols, such as games, in particular, wager games. In one aspect, the machines and methods provide a feature that may enhance traditional wager games (e.g., slot machines or other reel-type games) by providing a player with additional opportunities to win the game, thereby increasing the player's interest, anticipation, and excitement in connection with the game. This may in turn benefit a casino or another entity that provides a game with this feature. Indeed, wager games are typically configured to have odds that favor the casino (sometimes referred to as the "house"). Accordingly, based on the law of averages, casinos often maximize their profits simply by getting more players to play more games. Due to the provided feature, players may be drawn in (e.g., from competing casinos that lack games with such a feature) and they may play the game often. The feature can include new data communications between a server machine and a client machine within a server-client based configuration. Computer readable media may be used to store instructions for implementing machine implemented methods disclosed herein, and also for storing and tracking data related to game play (e.g. player credits, accumulated spins etc.). The data stored in the computer readable media can include data or a data structure to track or determine symbol positions of instances of particular symbols moved from a first symbol position to a second symbol position and data that indicates an instance of the particular symbol is to persist (e.g., remain to be displayed) for more than one outcome event.

II. Example Architecture

FIG. 1 shows a simplified block diagram of an example machine 100 arranged to implement functions in accordance with example methods described herein. Machine 100 may take any of a variety of forms, including for example a dedicated gaming machine, a personal computer, a personal digital assistant, a mobile phone, a tablet device, a smart phone or some other computing device.

Machine 100 may include a communication interface 102, a user interface 104, and a logic module 106, all of which may be coupled together by a system bus, network, or other connection mechanism 108. The communication interface 102 may include a wired or wireless network communication interface. For purposes of this description any data described as being sent or transmitted by machine 100 can be data sent by communication interface 102 over a communication network. Also, for purposes of this description any data described as being received by machine 100 can be data sent to communication interface 102 over a communication network.

The user interface 104 may facilitate interaction with a user (e.g., a player of a game) if applicable. As such, the user interface 104 may take the form of a graphical user interface (GUI) and may include output components such as a speaker and a display 110, and input components such as a keypad or a touch-sensitive screen. As described in greater detail below, display 110 may be configured to display, among other things, a symbol set in a game or a portion thereof. The input components can include an input device, such as a push button or handle, to initiate an outcome event (e.g., a base outcome event or a bonus outcome event). Display 110 can include a symbol-display-portion 116. As described in greater detail below, display 110 or symbol-display-portion

116 may be configured to display, among other things, a symbol set in a game or a portion thereof, or a particular symbol that is locked-down at a corresponding symbol position for a predetermined number of outcome events. Display 110 or symbol-display-portion 116 can be configured to display transitions between outcome events. Displaying the transitions can include displaying an animation showing one or more spinning reels or portions of one or more spinning reels within symbol-display-portion 116. Any reference in this description to a display or a symbol-display-portion displaying a symbol refers to the display and the symbol-display-portion displaying the symbol unless context dictates otherwise.

The logic module 106 can take the form of a processor 112 and a data storage 114. The processor 112 can include a general-purpose processor (e.g., a microprocessor) or a special-purpose processor (e.g., a digital signal processor or an application specific integrated circuit) and may be integrated in whole or in part with the communication interface 102 or the user interface 104. Any processor discussed in this description or shown in the drawings can be referred to as a computer-readable processor. Any data storage discussed in this description or shown in the drawings can be referred to as computer-readable data storage.

Data storage 114 may include volatile or non-volatile storage components and may be integrated in whole or in part with processor 112. Data storage 114 may take the form of a non-transitory computer-readable medium and may include software program instructions, that when executed by processor 112, cause machine 100 to perform one or more of the functions described herein. Any software program instructions discussed in this description or shown in the drawings can be referred to as computer-readable program instructions, or more simply, program instructions.

Data storage 114 may also include operating system software on which machine 100 may operate. For example, machine 100 may operate on a Windows™-based operating system (e.g., Windows XP, Windows 7, or Windows 8) provided by the Microsoft™ Corporation of Redmond, Washington.

Figure 2:
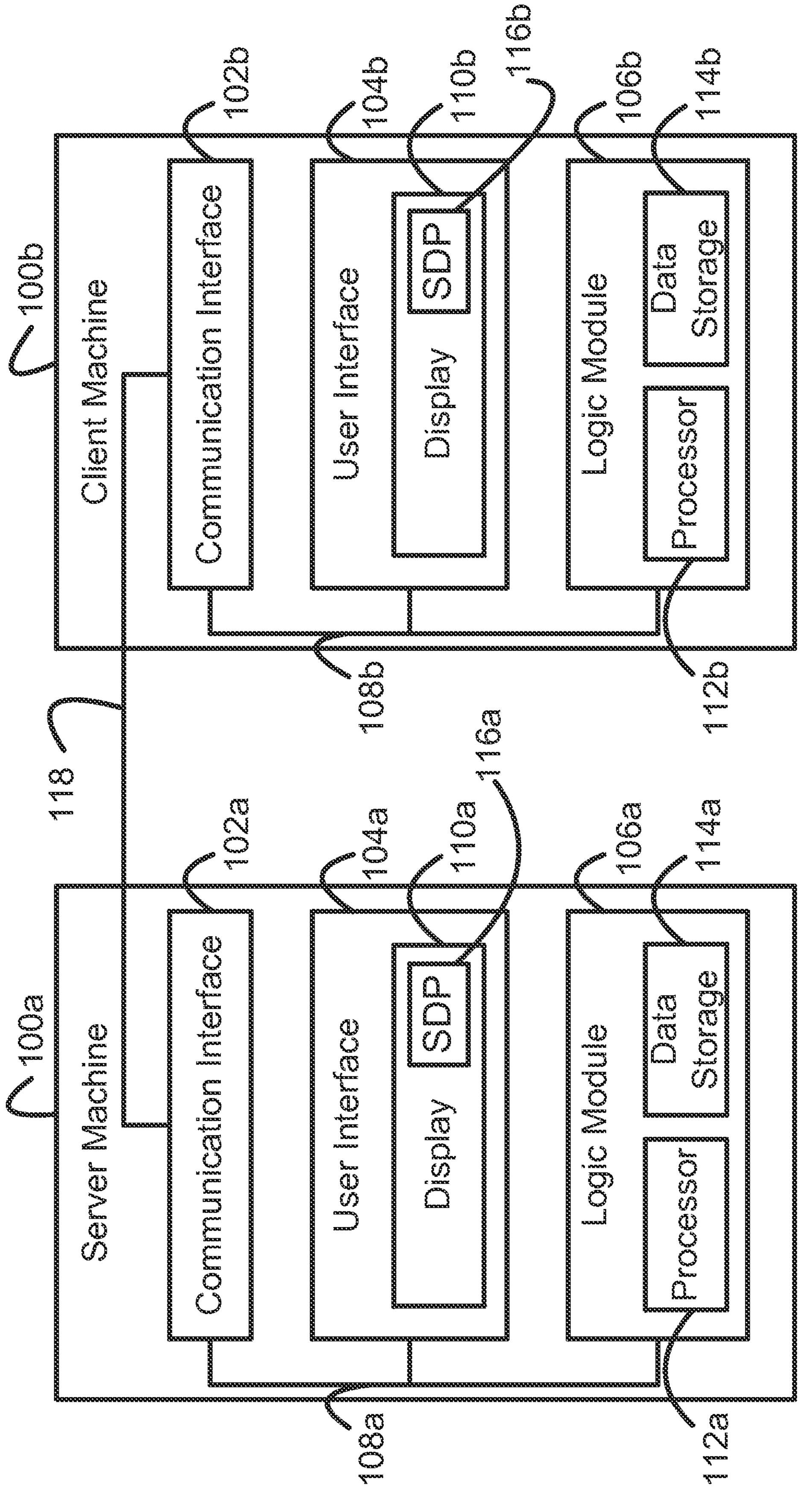
FIG. 2 is a simplified block diagram of an example server machine connected to an example client machine over a computer network, in an embodiment of the disclosure.

FIG. 2 is a simplified block diagram of an example server machine **100*a* connected to an example client machine (sometimes referred to as a workstation) 100*b* over a computer-network 118. A configuration of elements including server machine 100*a* and client machine 100*b*** can be referred to as a server-client based configuration.

The components of the server machine **100*a* and the client machine 100*b* are shown with corresponding "a" and "b" reference numerals (i.e., based on machine 100). For example, server machine 100*a* includes a communication interface 102*a*, a user interface 104*a*, and a logic module 106*a*, all of which may be coupled together by a system bus, network, or other connection mechanism 108*a*. User interface 104*a* can include a display screen 110*a* having a symbol display portion 116*a*. Logic module 106*a* can include a processor 112*a* and data storage 114*a*. As another example, client machine 100*b* includes a communication interface 102*b*, a user interface 104*b*, and a logic module 106*b*, all of which may be coupled together by a system bus, network, or other connection mechanism 108*b*. User interface 104*b* can include a display screen 110*b* having a symbol display portion 116*b*. Logic module 106*b* can include a processor 112*b* and data storage 114*b*. Data storage 114*a* can include program instructions executable by processor 112*a* to carry out the functions described herein as being performed by server machine 100*a*. Similarly, data storage 114*b* can include program instructions executable by processor 112*b* to carry out the functions described herein as being performed by client machine 100*b*. The components of the server machine 100*a* and the client machine 100*b* are shown with corresponding "a" and "b" reference numerals (i.e., based on machine 100). The server machine 100*a* is configured to communicate with the client machine 100*b* over the computer-network 118 (via the communication interfaces 102*a*, 102*b*). Likewise, the client machine 100*b* is configured to communicate with the server machine 100*a* over the computer-network 118. For purposes of this description, any data described as being sent or transmitted by the server machine 100*a* can be data sent by communication interface 102*a* over communication network 118. Similarly, any data described as being sent or transmitted by the client machine 100*b* can be data sent by communication interface 102*b* over communication network 118. Furthermore, for purposes of this description, any data described as being received by the server machine 100*a* can be data the server machine 100*a* receives from the communication network 118 using communication interface 102*a*. Similarly, any data described as being received by the client machine 100*b* can be data the client machine 100*b* receives from the communication network 118 using communication interface 102*b***.

The computer-network 118 for the server-client based configuration described above may take a variety of forms. For example, the computer-network 118 may be a local area network (LAN) in a casino, such that client machines **100*b* dispersed throughout the casino may communicate with the server machine 100*a*** in the casino.

In another example, the computer-network 118 may be a wide area network (WAN), such as an Internet network or a network of the World Wide Web. In such a configuration, the client machines **100*b* may communicate with the server machine 100*a* via a website portal (for a virtual casino) hosted on the server machine 100*a*. The data described herein as being transmitted by server machine 100*a* to client machine 100*b* or by client machine 100*b* to server machine 100*a*** can be transmitted as datagrams according to the user datagram protocol (UDP), the transmission control protocol (TCP), or another protocol.

The computer-network 118 may include any of a variety of network topologies and network devices, and may employ traditional network-related technologies, including for example the public switched telephone network, cable networks, cellular wireless networks, WiFi, and WiMAX. Further, the computer-network 118 may include one or more databases (e.g., a player credit account database), to allow for the storing and retrieving of data related to performing an outcome event by a machine.

For purposes of this description, any function listed in a sentence including the words the "machine 100 can cause," the "server machine **100*a* can cause," or the "client machine 100*b* can cause" can be carried out, at least in part, as a result of that particular machine executing software program instructions. Those software program instructions can be stored within data storage 114, 114*a*, or 114*b***.

Figure 5:
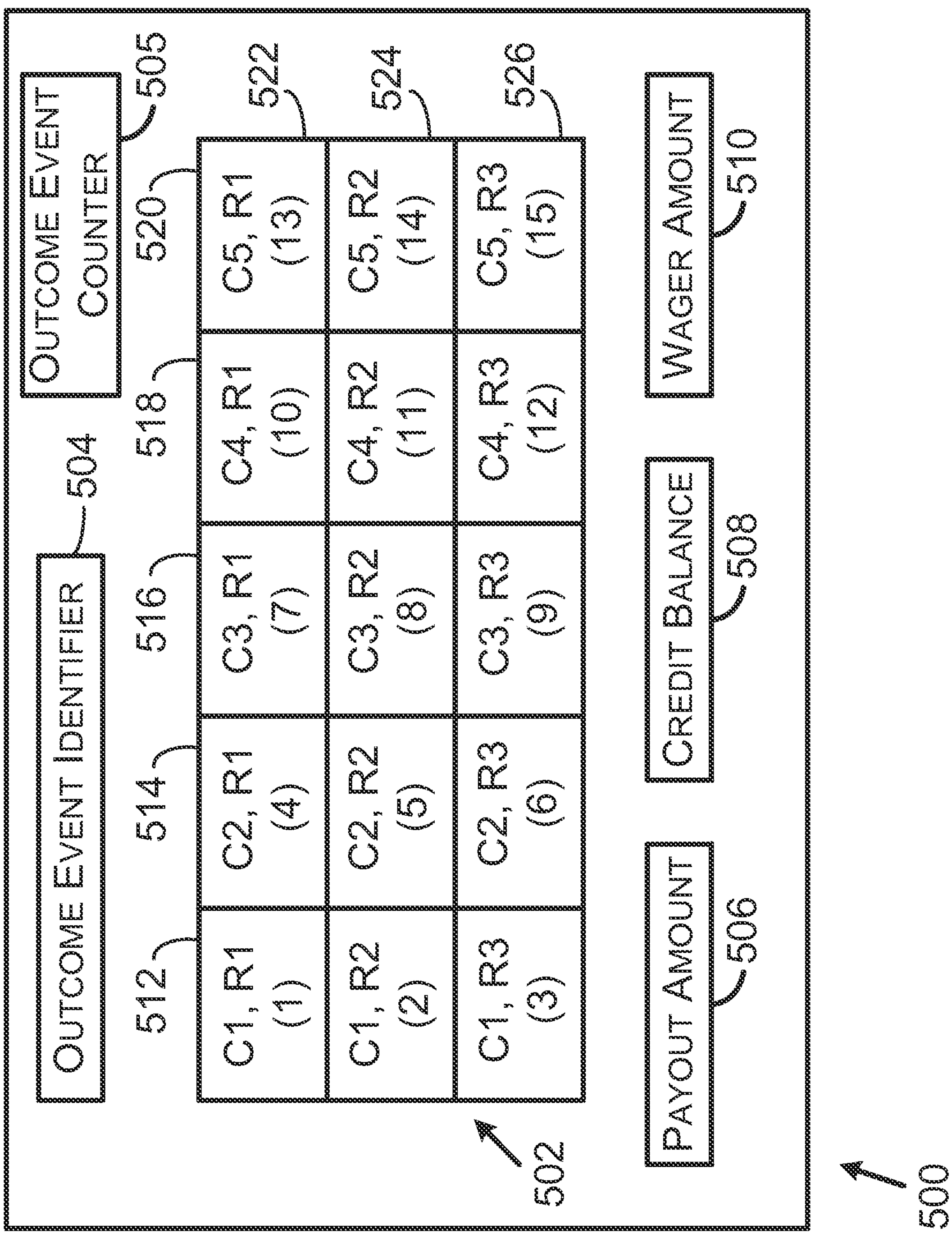
FIG. 5 depicts elements displayable by a display of a machine in accordance with the disclosure.

Next, FIG. 5 depicts a screenshot 500 that machine 100, server machine **100*a*, or client machine 100*b* can visually present (i.e., display) using displays 110, 110*a*, and 110*b*, respectively. For purposes of this description, each element of screenshot 500 can be a displayable element of the display. Screenshot 500 includes a symbol-display-portion 502, an outcome event identifier 504, an outcome event counter 505, a payout amount indicator 506, a credit balance indicator 508, and a wager amount indicator 510**.

Symbol-display-portion 502 can include multiple symbol-display-segments (i.e. rows and columns) and multiple symbol positions. As an example, the symbol-display-segments can include vertical symbol-display-segments 512, 514, 516, 518, and 520 (or more simply, vertical SDS 512-520). As another example, the symbol-display-segments can include horizontal symbol-display-segments 522, 524, and 526 (or more simply, horizontal SDS 522-526). Each symbol-display-segment can include multiple symbol positions. The vertical SDS 512-520 are shown in FIG. 5 as having three symbol positions. The horizontal SDS 522-526 are shown in FIG. 5 as having five symbol positions. A person skilled in the art will understand that those symbol-display-segments can be configured with different numbers of symbol positions than shown in FIG. 5.

The vertical SDS 512-520 can be configured as spinnable reels. The processor of a machine or system displaying screenshot 500 can display the spinnable reels spinning and stopped after spinning. For vertical SDS 512-520, the spinnable reels may spin in a vertical direction (e.g., top to bottom or bottom to top, with respect to the symbol-display-portion 502).

The horizontal SDS 522-526 can be configured as spinnable reels. The processor of a machine or system displaying screenshot 500 can display the spinnable reels spinning and stopped after spinning. For horizontal SDS 522-526, the spinnable reels may spin in a horizontal direction (e.g., left to right or right to left, with respect to the symbol-display-portion 502).

The multiple symbol positions in symbol-display-portion 502 are identified by column and row designators, in which C1=column 1, C2=column 2, C3=column 3, C4=column 4, C5=column 5, R1=row 1, R2=row 2, and R3=row 3. The multiple symbol positions in symbol-display-portion 502 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 5, C2 is between C1 and C3, C3 is between C2 and C4, and C4 is between C3 and C5.

For a matrix arrangement with 15 symbol positions as shown in FIG. 5, the numerical identifiers can be whole numbers 1 through 15, inclusive. The processors or machines described herein can be configured to select a symbol position of symbol-display-portion 502 using a random number generator that is configured to generate a number within the range 1 through N, inclusive, where N equals the number of symbol positions in symbol-display-portion 502. For the matrix arrangement, each symbol-display segment can be a distinct column of the multiple columns within the matrix. Alternatively, for the matrix arrangement, each symbol-display segment can be a distinct row of the multiple rows within the matrix.

The processor of the machines or systems described herein can determine a state the machine or system is operating in or an outcome event that can occur during the determined state of the machine or system. In response to making that determination, the processor can cause the outcome event identifier 504 to display an identifier of the outcome event that can occur during the determined state. For example, the outcome event identifier can identify a base outcome event, a bonus outcome event or another type of outcome event. The bonus outcome event can be a "Free spins' outcome event or some other outcome event.

The processor of the machines or systems described herein can determine a wager amount placed on an outcome event, a payout amount after or during occurrence of an outcome event resulting in a win, a credit balance after or while decreasing a number of credits based on placement of a wager or after or while increasing a number of credits based on a determined payout amount, and a number of awarded remaining outcome events that can occur. The processor can cause the determined wager amount to be displayed by the wager amount indicator 510, the determined payout amount to be displayed by the payout amount indicator 506, the determined credit balance to be displayed by the credit balance indicator 508, and the number of awarded remaining outcome events to be displayed by the outcome event counter 505.

III. Example Operation

Figure 3A:
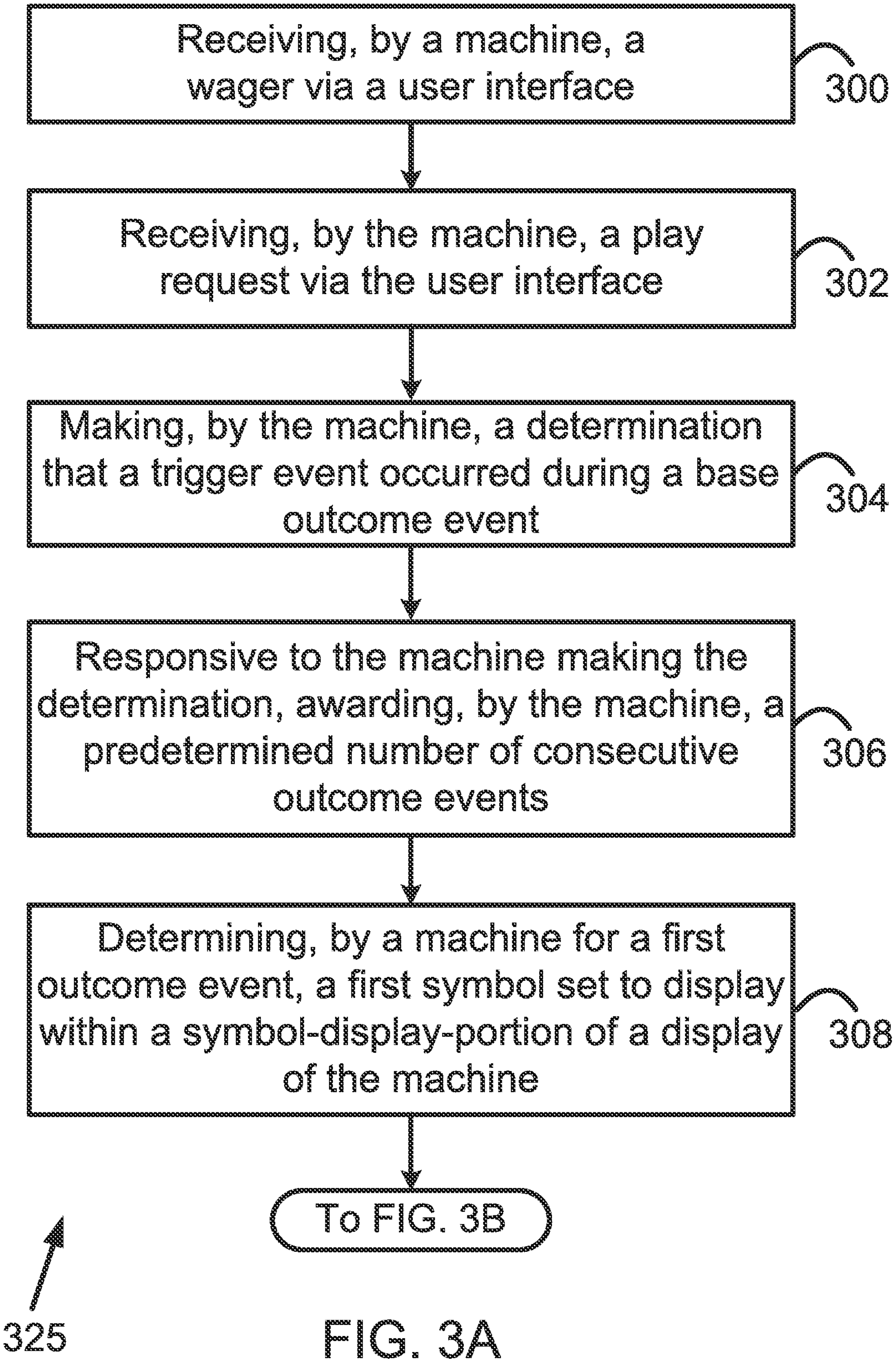
FIG. 3A is a first part of a flow chart showing functions in accordance with a method in an embodiment of the disclosure.
Figure 3B:
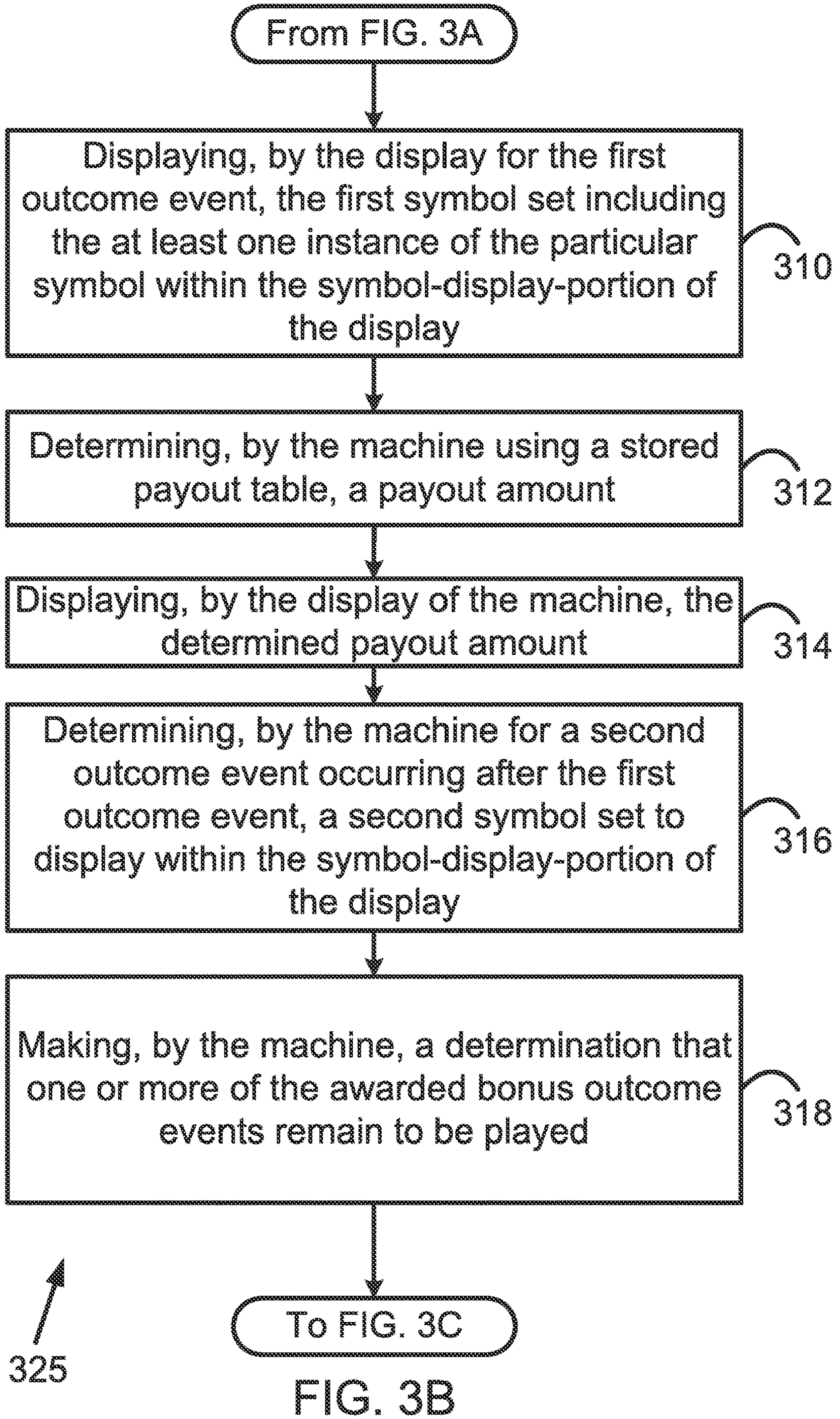
FIG. 3B is a second part of the flow chart of FIG. 3A.
Figure 3C:
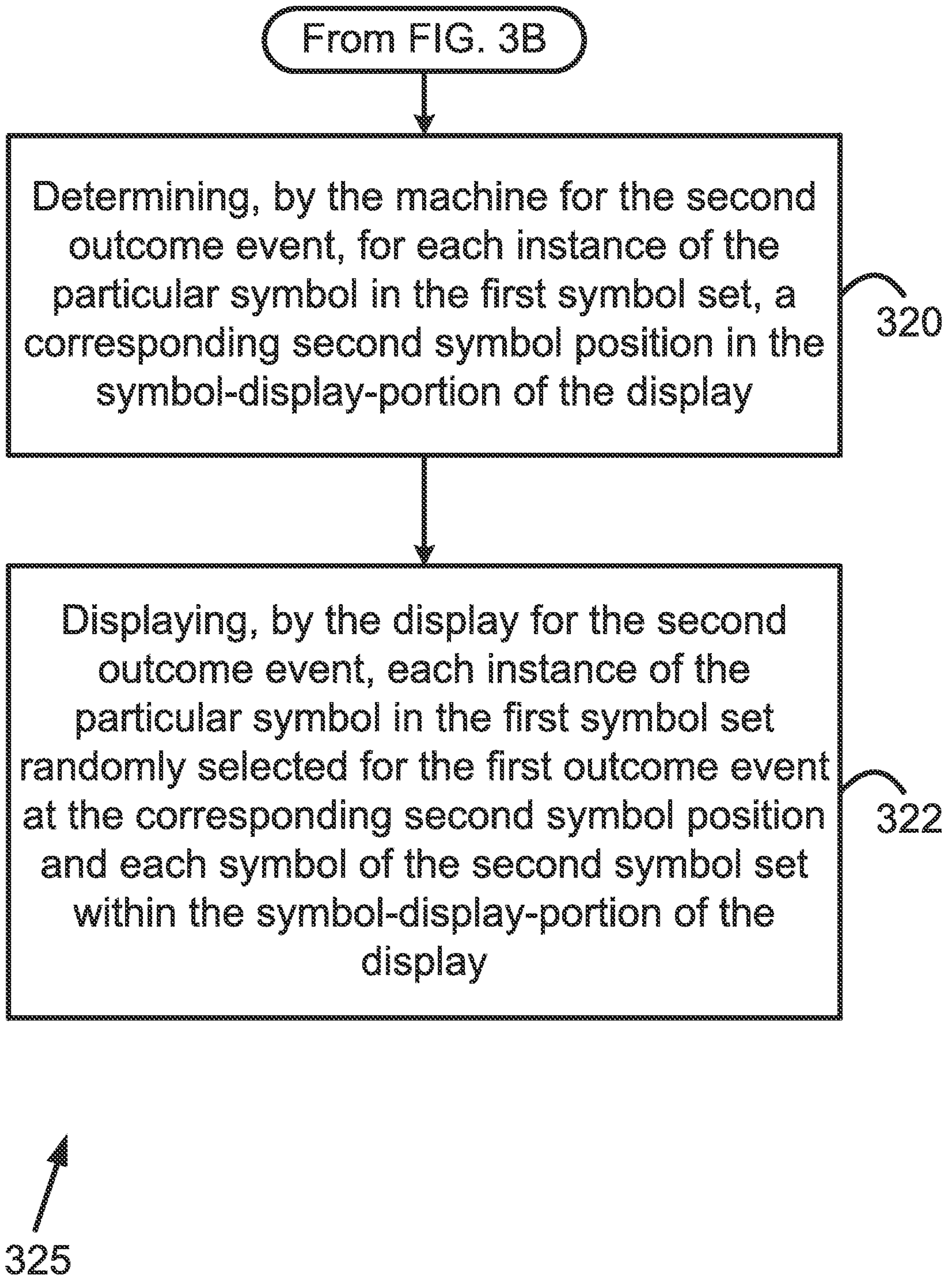
FIG. 3C is a third part of the flow chart of FIG. 3A.

FIG. 3A, FIG. 3B and FIG. 3C (i.e., FIG. 3A-3C) depict a flowchart showing a set of functions (e.g., operations) 325 (or more simply, "the set 325") that can, for example, be carried out using machine 100. The functions of the set 325 are shown within blocks labeled with even integers between 300 and 322, inclusive, and can pertain to a method in connection with machine 100. The example method can relate to performing outcome events, such as a wager game. Any other function(s) described herein as being performed by machine 100 can be performed prior to, while, or after performing any one or more of the functions of the set 325, unless context clearly dictates otherwise. Functions of the set 325 may be performed in response to, or independent of, user input. Those other function(s) can be performed in combination with or separately from any one or more of the functions of the set 325. Any function described below, or elsewhere in this description, with respect to FIG. 3A, FIG. 3B or FIG. 3C, can be performed, at least in part, by a processor, such as processor 112 executing software program instructions.

Block 300 includes receiving, by machine 100, a wager via the user interface 104. In one example, this may allow a player to enter a wager (e.g., a wager amount) using a keypad of the user interface 104. The wager can be placed on an outcome event, such as, but not limited to, a base outcome event configured as a wager game. The received wager may or may not provide a user of the machine with an opportunity to earn (e.g., win) a payout. Since a received wager does not necessarily provide an opportunity to earn a payout, the received wager can be referred to as a payment. A base outcome event can be carried out after or in response to receiving a payment. Machine 100 can be configured such that a bonus outcome event can be carried out without receiving any additional payment after receiving a payment to carry out a base outcome event resulting in an award of a predetermined number of bonus outcome events.

A player using machine 100 may have a corresponding player credit balance from which the entered wager may be deducted in response to the wager being entered or machine 100 receiving a play request from the player. For example, a player may have a player credit balance of 100,000 credits, which may be reduced to 99,750 credits upon the player requesting a play of the game with a wager of 250 credits. Additionally, or alternatively, the wager can be received by entry of a token, coin, or paper bill into the user interface 104 or by sliding or inserting a payment card, such as a credit or debit card, into the user interface 104. Machine 100 can cause display 110 to display wager information such as, but not limited to, a player credit balance on the credit balance indicator 508, possible wager amounts in wager amount indicator 510, and a received wager amount in wager amount indicator 510.

Next, block 302 includes receiving, by machine 100, a play request (e.g., a "spin" request) via the user interface 104. Receiving the play request can include or allow a player to pull a lever or push a button on machine 100 to initiate occurrence of an outcome event or to request a play of the wager game. Receiving the play request can result in the player's credit balance being reduced by an amount of the player's wager or a payment to carry out the outcome event.

Next, block 304 includes making, by machine 100, a determination that a trigger event occurred. The trigger event can be a randomly occurring event, such an event that randomly occurs during performance of at least some base outcome events. For example, occurrence of the trigger event can include machine 100 selecting, using a random process, a trigger symbol from a group of symbols, such as in connection with a previous play of the game (e.g., a base outcome event). In another example, occurrence of the trigger event can include machine 100 selecting a trigger symbol for display in a particular symbol position (e.g., in a middle row or a middle column). As yet another example, the trigger event can include machine 100 selecting, using a random number generator, a number in response to machine 100 receiving the play request, where the selected number is a trigger number. As still yet another example, the trigger event can include machine 100 displaying a particular combination of symbols selected from a global symbol set. Note that while a few example trigger events have been described above, any of a variety of other trigger events could be used to suit a desired configuration.

Making the determination that the trigger event occurred can occur while machine 100 operates in a first machine state (or more simply, the first state). Machine 100 can be configured such that, while machine 100 is operating in the first state, machine 100 allows the player to play base outcome events in which sets of symbols selected from a global symbol set can be selected by processor 112 and displayed by display 110, but a particular symbol displayable for bonus outcome events is not displayable by display 110. In other examples, the particular symbol may appear during base or bonus outcome events.

Next, block 306 includes, responsive to machine 100 making the determination (i.e., the determination made at block 304), awarding, by machine 100, a predetermined number of consecutive plays (e.g., spins) of outcome events. The awarded outcome events can be bonus outcome events, such as a game or a wager game. The predetermined number of consecutive outcome events can be conditioned upon a combination of symbols displayed by display 110 as a result of playing a base outcome event. Machine 100 can cause outcome event identifier 504 to identify the bonus outcome event awarded (e.g., a "Free spins" bonus) and to cause the outcome event counter 505 to display the predetermined number.

Furthermore, in response to making the determination at block 304, machine 100 can transition from operating in the first state to operating in a second machine state (or more simply, the second state). Machine 100 can be configured such that, while machine 100 is operating in the second state, machine 100 allows the player to play bonus outcome events in which sets of symbols selected from a global symbol set can be selected by processor 112 and displayed by display 110. Operating in the second state (i.e. initiating a first outcome event or first bonus outcome event) may include implementing one or more of blocks 308, 310, 316, 320, 322 described below. In some embodiments, blocks 308, 310, 316, 320, or 322 may be performed or repeated without user input. In a bonus round, for example, simulated spins and determinations of symbol sets and symbol positions may be performed or repeated without user input, since the bonus outcome events may not require a wager.

Machine 100 can be configured to transition from operating in the second state back to operating in the first state. This transition can occur in response to machine 100 determining any of a variety of trigger events, such as, but not limited to, occurrence of all of the awarded predetermined number of consecutive plays of the outcome event or a player stopping play of machine 100 while one or more of the awarded predetermined number of consecutive plays of the outcome event remain to occur. Machine 100 can be configured to store a number indicating any remaining consecutive plays of the outcome event and to allow a player awarded the consecutive plays to commence playing any remaining consecutive plays of the outcome event at a time after the player stops performing (e.g., playing) the outcome events.

Next, block 308 includes determining, by machine 100, a first symbol set to display within the symbol-display-portion of display 110 for a first outcome event. The first outcome event can be an earliest occurring outcome event of a predetermined number of awarded outcome events or any subsequent outcome event of those awarded outcome events. The first symbol set may include multiple symbols randomly selected from a global symbol set, and the multiple symbols randomly selected from the global symbol set may include at least one instance of a particular symbol randomly selected from the global symbol set. In other cases, the first symbol set may be determined not to include any instances of the particular symbol, however, aspects of this disclosure generally relate to cases where instances of the particular symbol are included in the first symbol set.

Determining the first symbol set can include processor 112 carrying out a random selection, such as a random selection of the first symbol set from the global symbol group. In other examples, the first symbol set may be determined based on data received by machine 100 that indicates the first symbol set.

The first symbol set may be determined to include one or more instances of a particular symbol. In one respect, the particular symbol may be the only particular symbol used for certain outcome events. In another respect, the particular symbol can be selected for display by processor 112 by selecting the particular symbol from among multiple symbols that can be used as the particular symbol described in this description.

Determining the first symbol set may also include determining at least one instance of a symbol to be included in the first symbol set and determining a symbol position within the symbol-display-portion of display 110 for the at least one instance of a symbol of the first symbol set. Both the determination of the at least one instance of the symbol and the determination of the symbol position may be performed randomly with the triggering of a new outcome event, so that the symbol can be displayed for the new outcome event.

Figure 6:
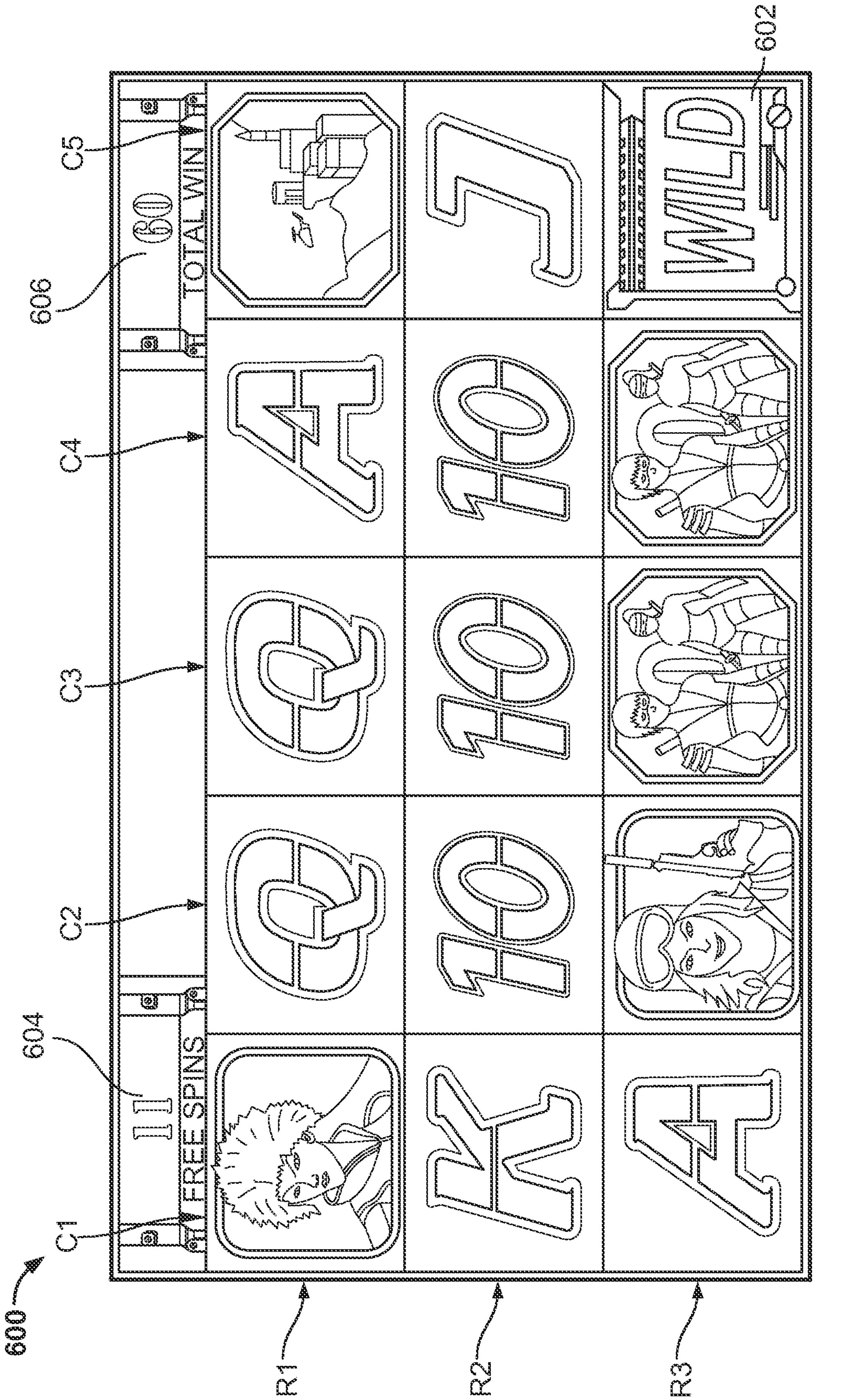
FIG. 6 depicts an example of a determined symbol set displayed by a display in accordance with the embodiments of the disclosure.
Figure 7:
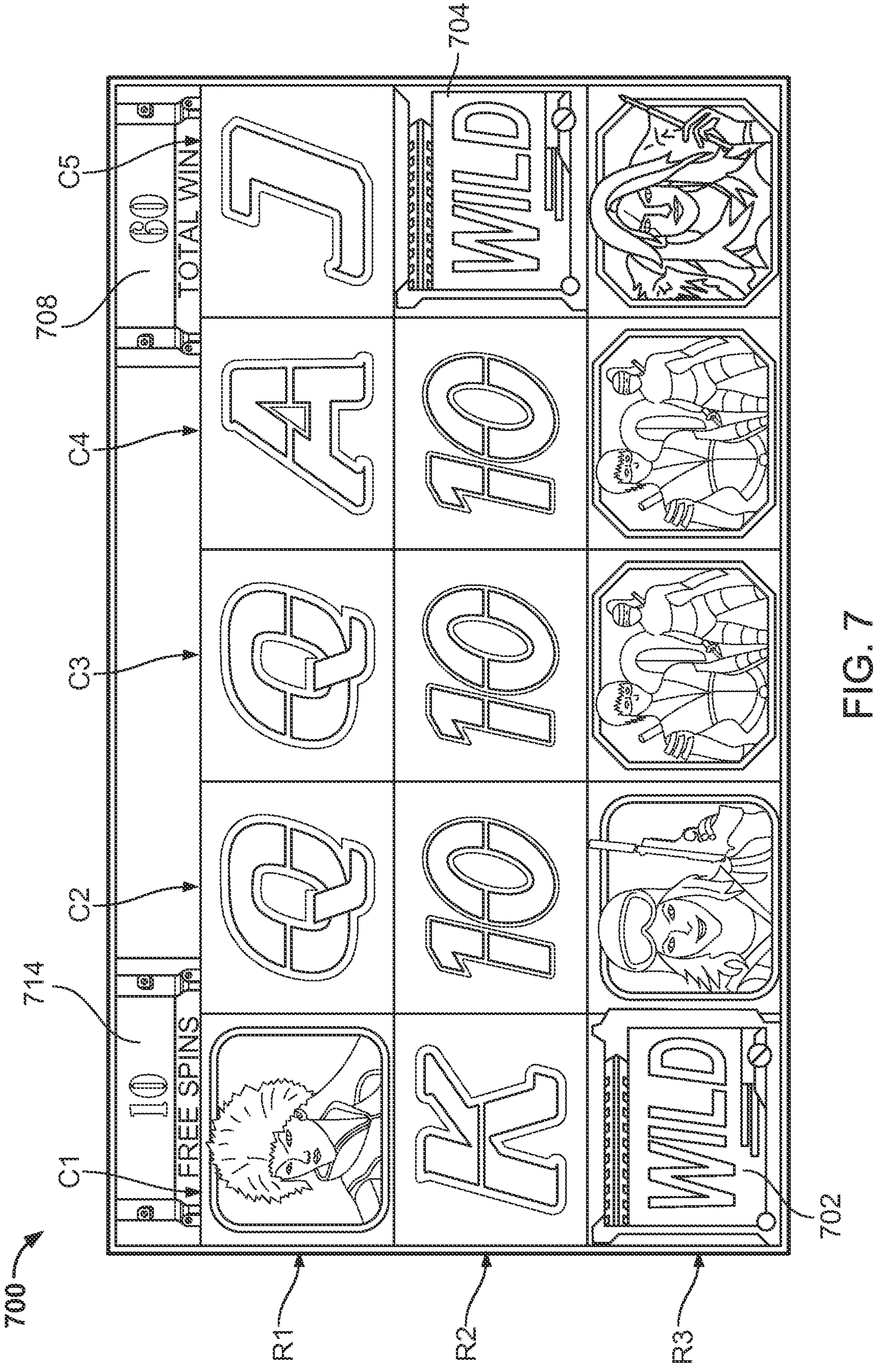
FIG. 7 depicts an example of a determined symbol set displayed by a display in accordance with the embodiments of the disclosure.

The global symbol group, from which the first symbol set is determined or selected, can include multiple symbols, such as a portrait of a person, a Wild, an Ace, a King or a Queen that may be used in connection with the outcome event, such as a wager game. The Ace, King, and Queen symbols can represent symbols found on a standard deck of playing cards. FIG. 6 and FIG. 7 depict examples of the aforementioned symbols and examples of other symbols that can be a part of the global symbol group. In FIG. 6, the Wild symbol 602 (i.e. the particular symbol) is shown in a single symbol position. The global symbol group may be customized with symbols as desired.

Figure 4:
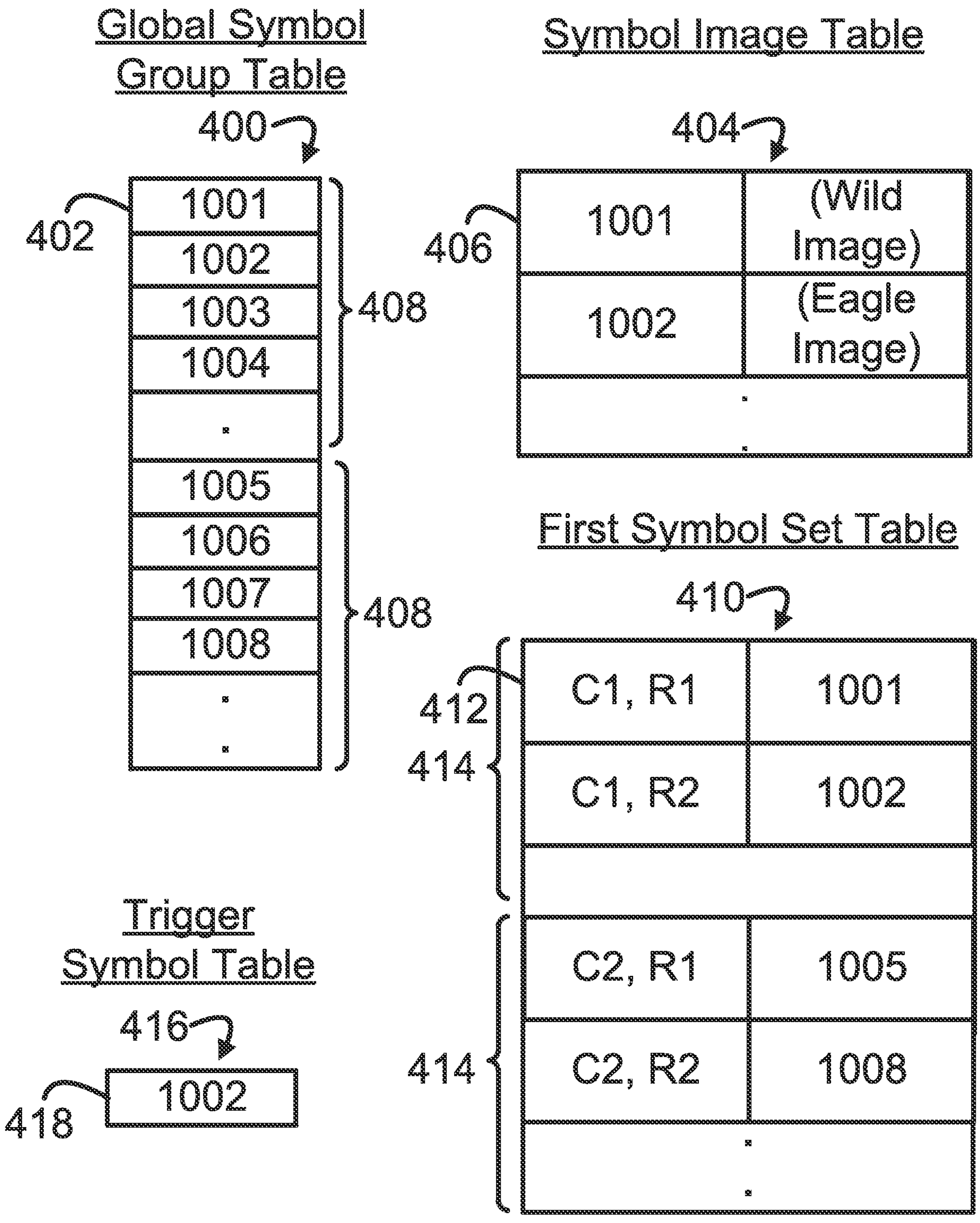
FIG. 4 depicts diagrams of tables used in accordance with machines and methods in embodiments of the disclosure.

In one example, the global symbol group may be represented as a table (or other data structure) stored in data storage 114. FIG. 4 shows an example global symbol group table 400. The global symbol group table 400 includes multiple records 402, each including an identifier (e.g., 1001, 1002, 1003, 1004, etc.) that represents a selectable symbol for displaying at a symbol position within a symbol-display-portion 116 of display 110. In one example, the global symbol group, and therefore the global symbol table 400, may be divided into multiple sub-groups 408 as discussed in greater detail below.

The global symbol group table 400 may be used in connection with a symbol image table 404. The symbol image table 404 includes multiple records 406 (shown as distinct rows of table 404), each including an identifier that represents a particular symbol, and a corresponding displayable image. As such, the symbol image table 404 may be used to map an identifier in the global symbol group table 400 to a displayable image.

The selected first symbol set may be represented by a first symbol set table 410. The first symbol set table 410 includes multiple records 412 (shown as distinct rows in table 410), each record including a symbol position of the symbol, and an identifier that represents the symbol. As such, each symbol in the selected first symbol set may correspond with a respective symbol position in an arrangement (e.g. both a column number and a row number in a column-and-row arrangement). As an example, C1, R1, shown in the first symbol set table 410, represents a symbol position at column 1 (e.g., a left-most column of a plurality of columns in a symbol-display-portion 502 of display 110) and row 1 (e.g., at top row of a plurality of rows in a symbol-display-portion 502 of display 110). The column identifiers in table 410 (e.g., C1 and C2) can refer to columns in a symbol matrix or reels of a plurality of reels that can be spun. Likewise, the row identifiers in table 410 (e.g. R1 and R2) can refer to rows in a symbol matrix or reels of a plurality of reels that can be spun.

In one example, machine 100 may select the first symbol set by iterating through each record 412 in the first symbol set table 410, and selecting a symbol identifier from among the symbol identifiers in the global symbol group table 400. In one example the symbol identifiers are numbers and machine 100 uses a random number generator to select such numbers, and therefore to randomly select symbols.

In one example, machine 100 may select each subset 414 in the first symbol set from the corresponding sub-group 408 in the global symbol group. This type of selection may be used when the symbol set represents one or more reels in a reel-type wager game. In this instance, each sub-group 408 includes all the symbols of a given reel, and the selected sub-set 414 includes the symbols of the reel that are "in play", namely those included in the selected first symbol set.

In one example, the first symbol set may be unrestricted. Alternatively, the first symbol set may be partially restricted. For instance, the first symbol set may be caused to include at least one instance of a particular symbol from the global symbol group, for example, a Wild symbol.

The corresponding first symbol position of the at least one instance of the particular symbol in the first symbol set may be unrestricted. For instance, the at least one particular symbol could be located at any symbol position. Alternatively, the corresponding first symbol position of the at least one particular symbol in the first symbol set may be restricted, such as restricting the at least one particular symbol to being located in a particular subset of symbol positions (e.g. a rightmost column of the symbol-display-portion of display 110).

As noted above, for each instance of a symbol in the selected first symbol set, the example embodiments can include machine 100 randomly determining a corresponding symbol position. As such, in an example where the arrangement is a column-and-row arrangement, machine 100 may randomly determine a column identifier and a row identifier (from a set of potential column identifier and row identifier combinations) for each instance of a symbol in the selected first symbol set. In an example where the arrangement has symbol position identifiers (e.g., whole number 1 through 15, inclusive, as described above), machine 100 may randomly select a symbol position identifier for each symbol in the selected first symbol set.

Referring to FIG. 3B, at block 310, the determined first symbol set, including at least one instance of the particular symbol, may be displayed within the symbol-display-portion of display 110 for the first outcome event. The at least one instance of the particular symbol may be displayed at a corresponding first symbol position within the symbol-display-portion of display 110.

Displaying the first symbol set for the first outcome event may include displaying at least one instance of the particular symbol (or other symbol instances) at rest within the symbol-display-portion of the display. For example, an instance of the particular symbol may be displayed at rest after a simulated horizontal or vertical reel of display 110 that includes the instance of the particular symbol has ceased spinning.

In one respect, data storage 114 can include one or more other symbol set tables similar to the first symbol set table 410, although not necessarily including or prohibited from including the identifiers corresponding to the symbol positions within the first symbol set table 410. In another respect, data storage 114 can reuse the first symbol set table 410 to store selected symbol identifiers for a next consecutive outcome event following the first outcome event. Processor 112 can select a respective set of symbols from the global symbol group table 400 for each outcome event carried out using machine 100.

The global symbol group table 400 can be used for selecting symbols to be displayed for bonus outcome events. The global symbol group table 400, a modified version of global symbol group table 400 or a different global symbol group table can be used for base outcome events. The modified version of the global symbol group table 400 or the different global symbol group table can include an identifier for a trigger symbol. Selecting one or more trigger symbols for display in the symbol-display-portion 502, in a predetermined pattern or otherwise, during a base game can result in triggering a predetermined number of bonus outcome events. Data storage 114 can include a trigger symbol table 416 including one or more trigger symbol records 418 to store an identifier of a symbol selected as a trigger symbol. The trigger symbol table 416 can be, but is not required to be, cleared out (e.g., filled with null values) while the bonus outcome events are occurring.

FIG. 6 shows an example of a symbol set 600 selected from the global symbol group for display during a first outcome event (possibly a bonus outcome event). As described above, the bonus outcome event can be initiated pursuant to machine 100 making a determination that one or more of the awarded outcome events have not yet occurred (i.e., remain to occur). The displayed symbol set 600 includes a total of fifteen instances of symbols, including a single instance of a particular symbol (i.e. the Wild symbol) 602 at position C5, R3 in the arrangement that includes columns C1 through C5 and rows R1 through R3. The remaining positions in the symbol-display-portion display other symbols selected from the global symbol set. Where the column and row arrangement is used to simulate reels, machine 100 may display a subset of symbols of the global symbol set in a corresponding column, such as by superimposing each subset over a virtual reel in a corresponding column. In one example, Wild symbols may appear initially only in a symbol position in the rightmost column (i.e. column C5) of the arrangement. Other examples are possible. FIG. 6 also includes an outcome event counter 604 and a credit balance 606, corresponding respectively to outcome event counter 505 and credit balance 508 of FIG. 5. Once the symbol set 600 is determined, machine 100 may provide a payout or decrement the outcome event counter 604 (see outcome event counter 714 at FIG. 7). Based on the payout (if any) the credit balance 606 may be updated as well (see credit balance 708 at FIG. 7).

Returning to FIG. 3B, block 312 includes determining, by machine 100 using a stored payout table, a payout amount. The payout table can be stored in data storage 114. The payout table can define multiple symbol combinations and base payout amounts. Table 1 below includes example data that can be stored within the payout table. In Table 1, the multiple symbol combinations include a symbol for each column in a five column matrix arrangement. For a reel type game, the column numbers in Table 1 can refer to reel numbers. A winning symbol combination can be defined for a number of symbols other than five symbols included in a single row. A Wild symbol located at any given symbol position can take the place of any symbol defined for the given symbol position in any winning symbol combination. As an example, the base payout value can represent a number of credits or an amount of currency.

TABLE 1

| Column 1 | Column 2 | Column 3 | Column 4 | Column 5 | Base Payout |
|---|---|---|---|---|---|
| Ace | King | Queen | Jack | Ten | 100 |
| Ace | Ace | Ace | Ace | King | 75 |
| King | King | Queen | Queen | Queen | 65 |

Processor 112 can execute program instructions to determine whether a payout is earned (e.g., won) as a result of each outcome event occurring at machine 100. If a payout is not earned, the payout amount can be zero. If a payout is earned, the payout amount can be a function of the received wager and the symbol set selected for the outcome event (e.g., the first symbol set selected for the first outcome event) or the corresponding arrangements of symbols in the selected first symbol set. The payout amount can be the payout amount associated with a symbol combination located on a pay line selected or being used for the outcome event.

In one example, machine 100 may also physically dispense a corresponding payout (e.g., cash), or otherwise facilitate the payout to the player (by adding funds to an electronic account associated with a gaming card). Additionally or alternatively to determining the payout amount, machine 100 may perform other actions to award the player. For instance, the machine may display an indication of a tangible prize. Other types of awards may be used as well.

Next, block 314 includes displaying, by display 110 of machine 100, the determined payout amount. For example, where machine 100 has determined, using the stored payout table, a payout amount of 500 credits, machine 100 may display on display 110 the determined payout amount of 500 credits. Additionally or alternatively, machine 100 may add the determined payout amount to the player credit balance and display the updated player credit balance. For instance, where the player credit balance was 99,750 credits before the payout amount was determined, machine 100 may add the determined payout amount of 500 credits to the player credit balance so that the updated balance is 100,250 credits. Furthermore, machine 100 can cause display 110 to display a count-up from a first balance amount (e.g., 99,750 credits) to a second balance amount (e.g., 100,250 credits), where the second balance amount equals a sum of the first balance amount and the determined payout amount.

Next, block 316 includes determining, by the machine 100 for a second outcome event occurring after the first outcome event, a second symbol set to display within the symbol-display-portion of the display 110. The number of symbols in the second symbol set for the second outcome event may be determined by the machine 100 to be the number of instances of symbols of the first symbol set, less a number of instances of the particular symbol of the first symbol set. Otherwise, the second symbol set may be determined similarly to how the first symbol set is determined. The second symbol set may also include additional instances of the particular symbol.

Next, block 318 includes making, by machine 100, a determination that one or more of the awarded bonus outcome events remain to be played. In that regard, processor 112 may determine that one or more awarded bonus outcome events have not occurred.

Next, referring to FIG. 3C, block 320 includes, determining, by the machine 100 for the second outcome event, for each instance of the particular symbol in the first symbol set, a corresponding second symbol position in the symbol-display-portion of the display 110. In one example, the corresponding first symbol position is within a first perimeter column, such as a rightmost column of the symbol-display-portion of the display, while the second corresponding position lies within a second perimeter column of the display 100, such as a leftmost column.

In another example, the machine 100 may determine that an instance of the particular symbol occupies a given symbol position for the first outcome event. The given symbol position and the corresponding first symbol position may lie within a common row. The machine 100 may then determine the corresponding second symbol position to be a symbol position within the common row between the first corresponding symbol position and the given symbol position. This may result in a "stacking wilds" effect where a second instance of the particular symbol is caused to be displayed adjacent to a first instance of the particular symbol within the common row. That is, the corresponding second symbol position may be the leftmost symbol position in the same row of the arrangement that is not already a corresponding second position of an instance of a particular symbol.

In another embodiment, the first corresponding position (of the at least one instance of the particular symbol) may be located within a first perimeter row, such as a topmost row of the symbol-display-portion of the display 110. Here, the corresponding second symbol position may be located within a second perimeter row, such as a bottommost row of the symbol-display-portion of the display 110. The machine 100 may determine that an instance of the particular symbol occupies a given symbol position for the first outcome event. The given symbol position and the corresponding first symbol position may be within a common column of the symbol-display-portion of display 100. The machine 100 may then determine the second symbol position to be a symbol position within the common column between the first corresponding symbol position and the given symbol position. As an example, the corresponding second symbol position may be adjacent to the given symbol position. That is, the corresponding second symbol position may be the bottommost symbol position in the same column of the arrangement that is not already a corresponding second position of an instance of a particular symbol. This may result in a "stacking wilds" effect, where a second instance of the particular symbol is caused to be displayed adjacent to a first instance of the particular symbol within the common column.

In another embodiment, the machine 100 may determine the corresponding second symbol position to be a symbol position adjacent to the first corresponding symbol position, either in a common row or a common column. This may result in an instance of the particular symbol incrementally moving from one end of the display 100 to another end of the display 100 during successive outcome events.

In yet another embodiment, the corresponding second symbol position and the corresponding first symbol position may lie at opposite ends of the symbol-display-portion of display 100, such as at opposite perimeter rows or opposite perimeter columns.

Next, block 322 includes displaying, by the display for the second outcome event, each instance of the particular symbol in the first symbol set determined for the first outcome event, at the corresponding second symbol position within the symbol-display-portion of the display. This may also include the display 110 simultaneously displaying a second determined symbol set and each instance of the particular symbol from the first symbol set moving from the corresponding first symbol position to the corresponding second symbol position.

Portions of the set 325 can repeat to carry out distinct outcome events of the predetermined number of events.

In some examples, the number of symbols in the second symbol set for the second outcome event may be determined by the machine 100 to be the number of instances of symbols of the first symbol set, less a number of instances of the particular symbol of the first symbol set. Processor 112 can then cause display 110 to simultaneously display, within the symbol-display-portion 502 for the second outcome event, the second symbol set for the second outcome event, and additionally, instances of the particular symbol of previously determined symbol sets that remain in the display 110 from previous outcome events.

The method may further include the machine 100 determining that a trigger event occurred during an outcome event preceding the first outcome event and performing any of the above mentioned functions in response. In some examples, steps may be periodically performed while the machine 100 determines that bonus outcome events remain to be played.

The method may further include determining, using a payout table, payout amounts corresponding to the first and second outcome events, based at least in part on the first and second symbol sets, respectively.

The method may also include determining, for a given outcome event, that a given column (or row) of the symbol-display-portion of the display contains, at least one instance of a symbol that is not the particular symbol. The machine 100 may then display, for a subsequent outcome event, each given instance of the particular symbol (if any) displayed within the given column (or row) at a symbol position that the given instance of the particular symbol occupied during the given outcome event. This may result in "wild" symbols remaining at their respective symbol positions for multiple outcome events to create more opportunities for payouts.

The method may also include determining, for a given outcome event, that a given column (or row) of the symbol-display-portion of the display is occupied, at every symbol position of the given column (or row), by instances of the particular symbol. After determining a payout for the given outcome event, the machine 100 may cause, for a subsequent outcome event, the instances of the particular symbol occupying the entire given column (or row) to be removed from the display. In this way, "wild" symbols may be allowed to occupy an entire column for only one outcome event. In an alternative embodiment, the particular symbols occupying the entire given column (or row) could be removed after a specific number of outcomes events greater than one (e.g., two or three outcome events) have occurred. Upon removing an entire row or column of instances of the particular symbol, the next outcome event may include symbol positions of the row or column being randomly filled with symbols selected from the global symbol set. In another example, instances of particular symbols that appeared in a different row or column during a previous outcome event may move, for the next outcome event, into the row or column that was filled with particular symbols.

FIG. 7 shows an example of a symbol set 700 selected from the global symbol group for display during an outcome event following that of FIG. 6. In one example, the symbol set 700 may include all fifteen depicted instances of symbols in FIG. 7 besides Wild symbol 702, which remains from the outcome event of FIG. 6 and thus was not randomly selected for the outcome event of FIG. 7. As described above, if the machine 100 is in a second state (i.e. a bonus round state), an additional bonus outcome event can be initiated pursuant to machine 100 making a determination that one or more of the awarded bonus outcome events have not yet occurred (i.e., remain to occur). The Wild symbol 702 is displayed at symbol position C1, R3, which is the corresponding second symbol position of Wild symbol 602 that appeared in the previous outcome event of FIG. 6 (i.e. the leftmost symbol position in the same row R3 of the arrangement). The symbol set 700 includes a Wild symbol 704 at its corresponding first symbol position in column C5 (at symbol position C5, R2 of the symbol-display-portion of the display 110). In this example, Wild symbol 704 was randomly determined to be included in the symbol set 700. Moreover, the symbols at the symbol positions (C5, R1) and (C5, R3) in the symbol set 700 are different than the symbols at the symbol positions (C5, R1) and (C5, R3), respectively, in the symbol set 600 (shown in FIG. 6).

Figure 8:
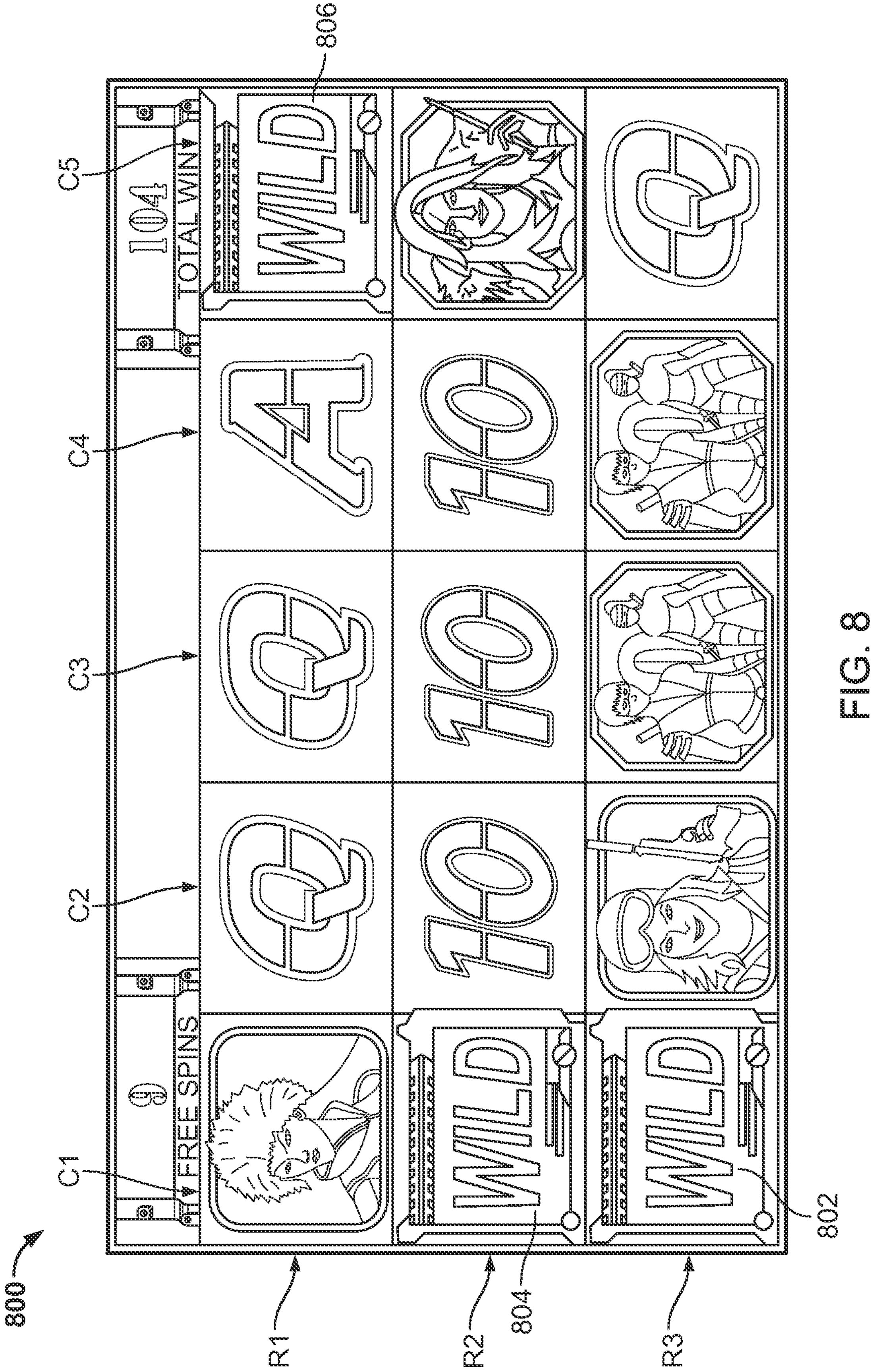
FIG. 8 depicts an example of a determined symbol set displayed by a display in accordance with the embodiments of the disclosure.

FIG. 8 shows an example of a further symbol set 800 selected from the global symbol group for display during an outcome event following that of FIG. 7. In one example, the symbol set 800 may include all fifteen depicted instances of symbols in FIG. 8 besides Wild symbols 802 and 804, which remain from previous outcome events and thus were not randomly selected for the outcome event of FIG. 8. Wild symbol 802 (at symbol position (C1, R3)) has carried over from the previous outcome event of FIG. 7. Wild symbol 804 is located at symbol position C1, R2, which is the corresponding second symbol position of Wild symbol 704 that appeared in the previous bonus outcome event of FIG. 7 (i.e. the leftmost symbol position in the same row R2 of the arrangement). The symbol set 800 includes a randomly selected additional Wild symbol 806 in column C5 at its corresponding first symbol position (at symbol position C5, R1). Moreover, the symbols at the symbol positions (C5, R2) and (C5, R3) in the symbol set 800 are different than the symbols at the symbol positions (C5, R2) and (C5, R3), respectively, in the symbol set 700 (shown in FIG. 7).

Figure 9:
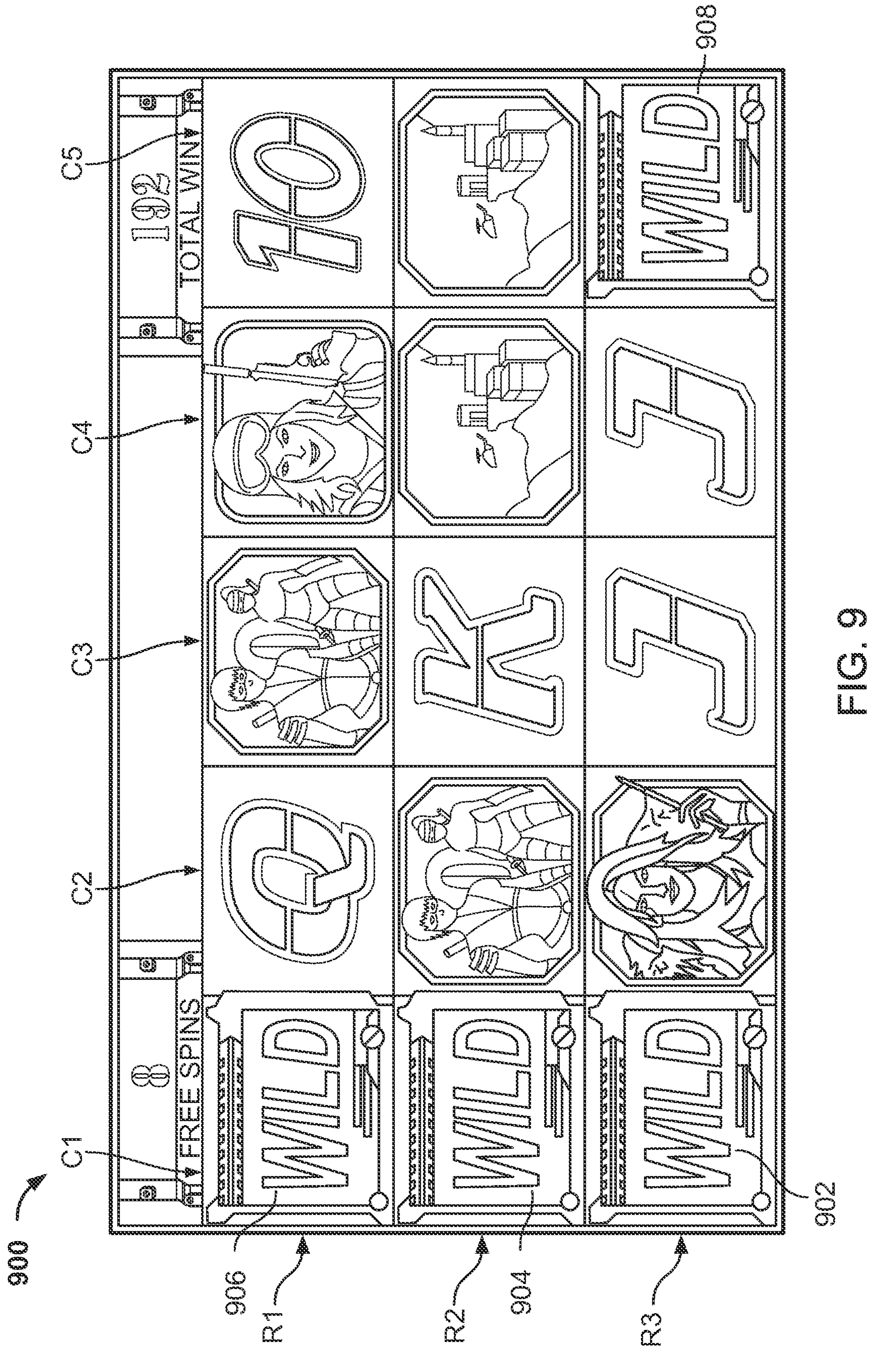
FIG. 9 depicts an example of a determined symbol set displayed by a display in accordance with the embodiments of the disclosure.

FIG. 9 shows an example of a still further symbol set 900 selected from the global symbol group for display during an outcome event following that of FIG. 8. In one example, the symbol set 900 may include all fifteen depicted instances of symbols in FIG. 9 besides Wild symbols 902, 904, and 906, which remain from previous outcome events and thus were not randomly selected for the outcome event of FIG. 9. Wild symbol 902 (at symbol position C1, R3) has carried over from the previous bonus outcome events of FIG. 7 and FIG. 8, and Wild symbol 904 (at symbol position C1, R2) has carried over from the bonus outcome event of FIG. 8. Wild symbol 906 is located at symbol position C1, R1 which is the corresponding second symbol position of Wild symbol 806 that appeared in the previous outcome event of FIG. 8 (i.e. the leftmost symbol position in the first row R1 of the arrangement). The symbol set 900 includes a randomly selected additional Wild symbol 908 in column C5 at its corresponding first symbol position (at symbol position C5, R3). The leftmost column C1 is thus filled with Wild symbols at each symbol position. Moreover, the symbols at the symbol positions (C2, R2), (C2, R3), (C3, R1), (C3, R2), (C3, R3), (C4, R1), (C4, R2), (C4, R3), (C5, R1), (C5, R2), and (C5, R3) in the symbol set 900 are different than the symbols at the symbol positions (C2, R2), (C2, R3), (C3, R1), (C3, R2), (C3, R3), (C4, R1), (C4, R2), (C4, R3), (C5, R1), (C5, R2), and (C5, R3), respectively, in the symbol set 800 (shown in FIG. 8).

In one embodiment, the Wild symbols that fill an entire column of the arrangement may be removed from the symbol display area for the next outcome event. In an alternative embodiment, the particular symbols occupying the entire given column (or row) could be removed after a specific number of outcomes events greater than one (e.g., two or three outcome events) have occurred.

Figure 10:
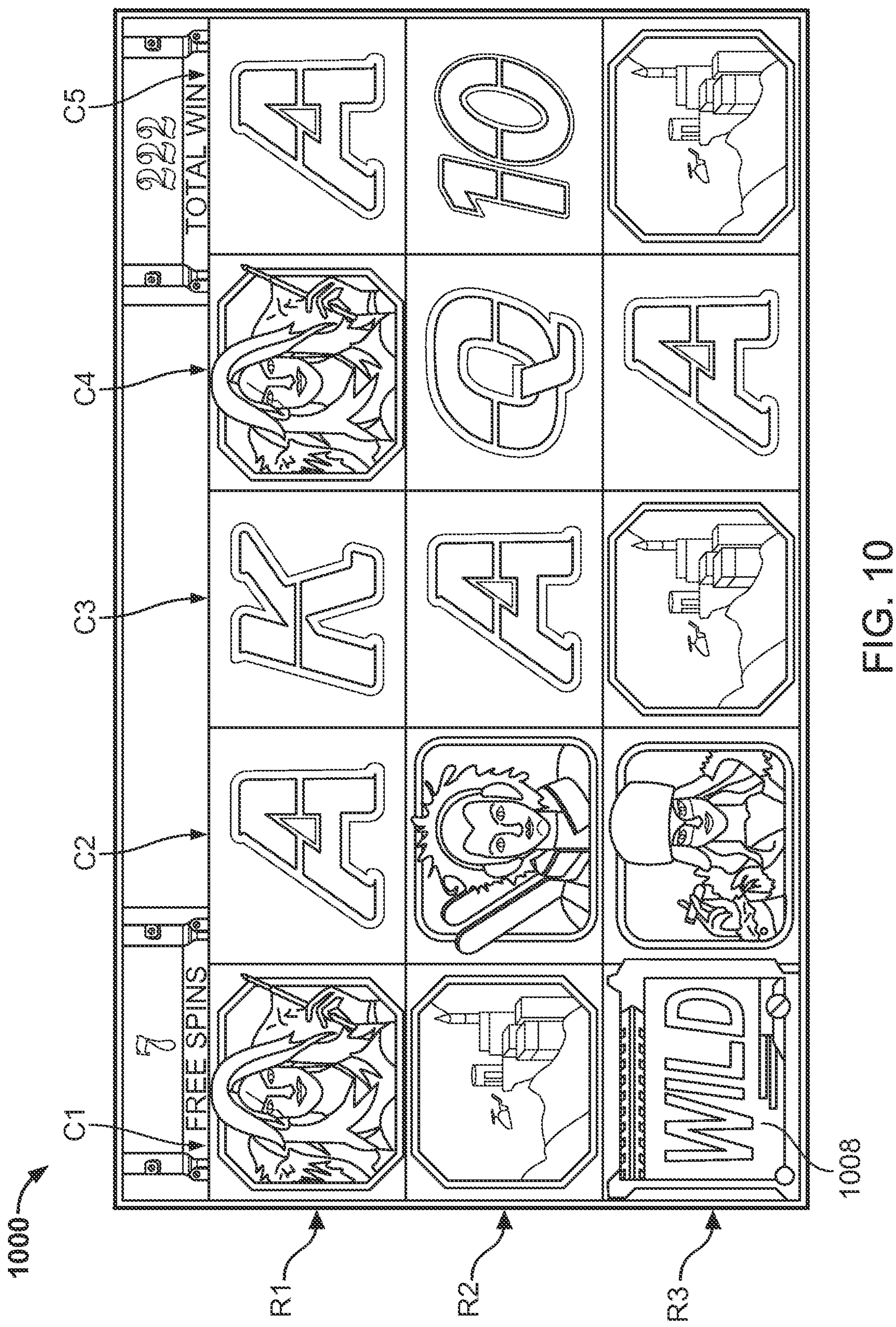
FIG. 10 depicts an example of a determined symbol set displayed by a display in accordance with the embodiments of the disclosure.

FIG. 10 shows an example of a yet further symbol set 1000 selected from the global symbol set for display during a next outcome event following that of FIG. 9. In one example, the symbol set 1000 may include all fifteen depicted instances of symbols in FIG. 10 besides Wild symbol 1008 which remains from a previous outcome event and thus was not randomly selected for the outcome event of FIG. 10. The three Wild symbols 902, 904 and 906 that filled column C1 of FIG. 9 have been removed. Wild symbol 1008 is located at symbol position C1, R3 which is the corresponding second symbol position of Wild symbol 908 that appeared in the previous outcome event of FIG. 9 (i.e. the leftmost symbol position in the same row R3 of the arrangement after removal of the previous Wild symbol that occupied that symbol position). Moreover, the symbols at the symbol positions (C1, R1), (C1, R2), (C2, R1), (C2, R2), (C2, R3), (C3, R1), (C3, R2), (C3, R3), (C4, R1), (C4, R2), (C4, R3), (C5, R1), (C5, R2), and (C5, R3) in the symbol set 900 are different than the symbols at the symbol positions (C1, R1), (C1, R2), (C2, R1), (C2, R2), (C2, R3), (C3, R1), (C3, R2), (C3, R3), (C4, R1), (C4, R2), (C4, R3), (C5, R1), (C5, R2), and (C5, R3), respectively, in the symbol set 900 (shown in FIG. 9).

Figure 11:
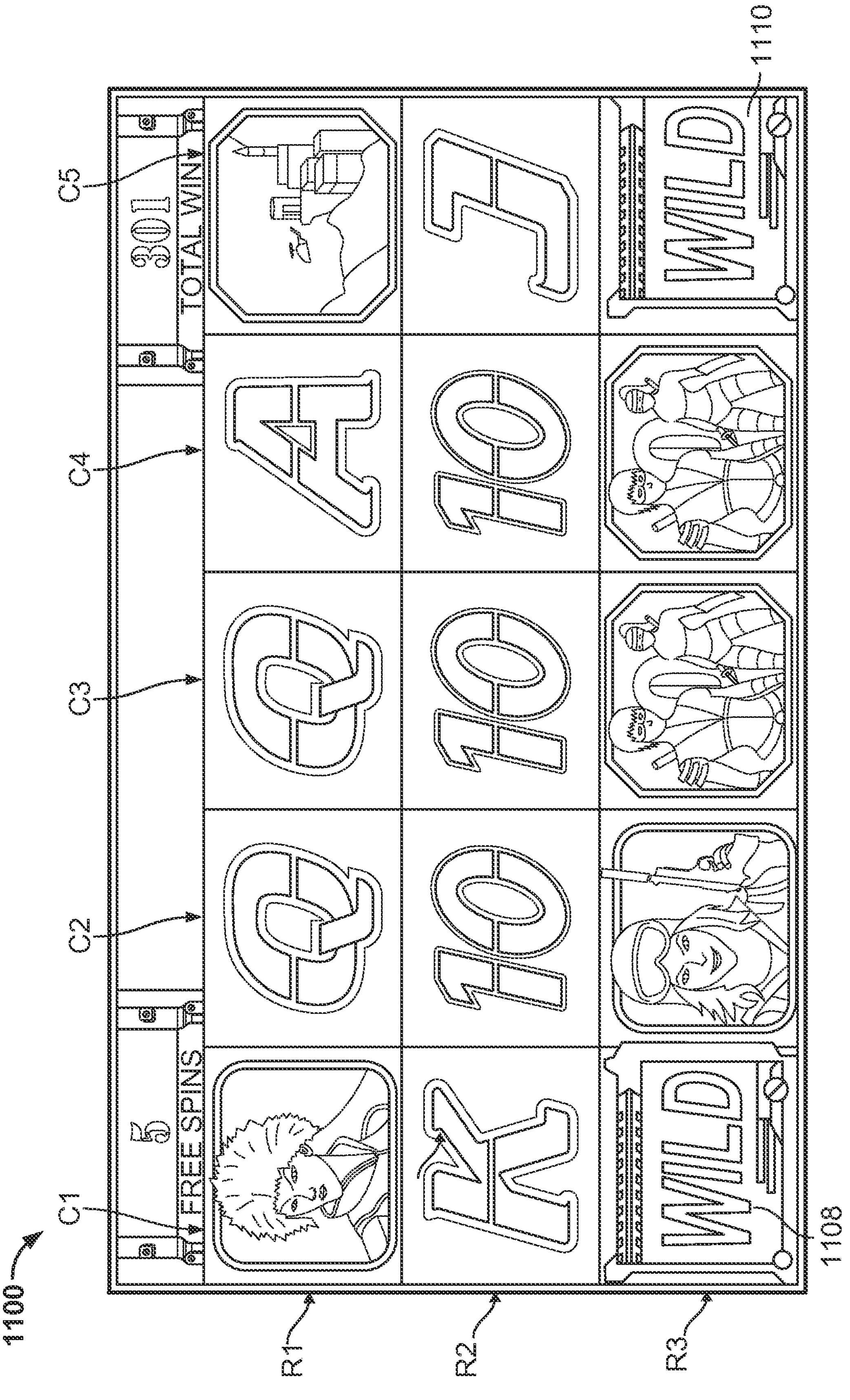
FIG. 11 depicts an example of a determined symbol set displayed by a display in accordance with the embodiments of the disclosure.

FIG. 11 shows one more example of a symbol set 1100 selected from the global symbol set for display during an outcome event subsequent to that of FIG. 10. In one example, the symbol set 1100 may include all fifteen depicted instances of symbols in FIG. 11 besides Wild symbol 1108 which remains from previous outcome events and thus was not randomly selected for the outcome event of FIG. 11. Wild symbol 1108 (at symbol position C1 R3) has carried over from the outcome event of FIG. 10 (and perhaps from an outcome event intervening between those of FIG. 10 and FIG. 11). The symbol set 1100 includes a randomly selected Wild symbol 1110 in column C5 at its corresponding first symbol position (at symbol position C5, R3). Note, that there may have been an intervening outcome event occurring between those depicted in FIG. 10 and FIG. 11. For instance, 7 remaining free spins are indicated in FIG. 10, but only 5 remaining free spins are indicated in FIG. 11. The intervening outcome event may have resulted in no new wild symbols (i.e. particular symbols) appearing at corresponding first symbol positions, and thus has been omitted from the figures for brevity's sake.

Figure 12:
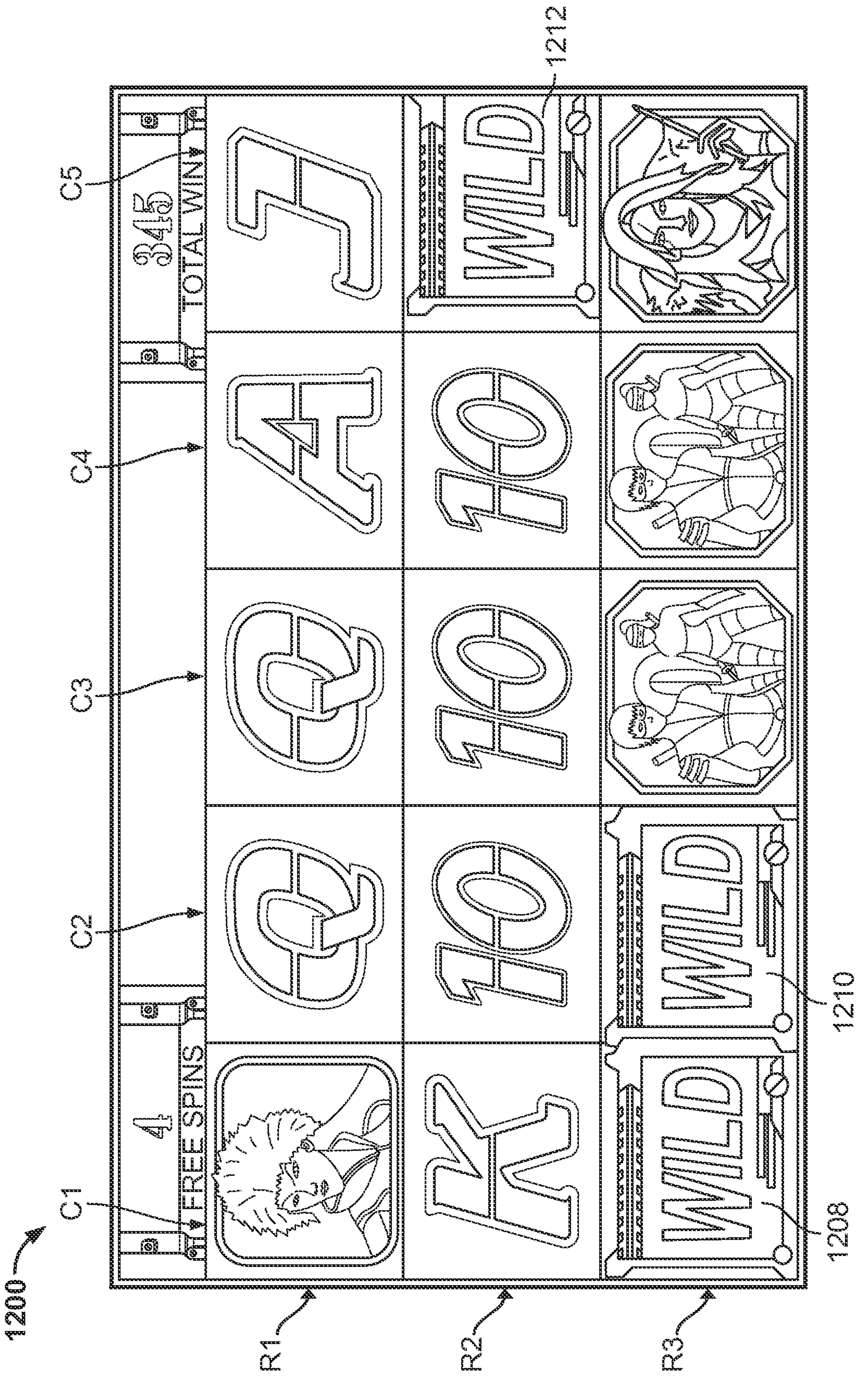
FIG. 12 depicts an example of a determined symbol set displayed by a display in accordance with the embodiments of the disclosure.

FIG. 12 shows another example of a symbol set 1200 during an outcome event following that of FIG. 11. In one example, the symbol set 1200 may include all fifteen depicted instances of symbols in FIG. 12 besides Wild symbols 1208 and 1210 which remain from previous outcome events and thus were not randomly selected for the outcome event of FIG. 12. Wild symbol 1208 (at symbol position C1, R3) has carried over from the outcome events of FIG. 10 and FIG. 11 (and perhaps from an outcome event intervening between those of FIG. 10 and FIG. 11). Wild symbol 1210 is located at symbol position C2, R3 which is the corresponding second position of Wild symbol 1110 that appeared in the previous bonus outcome event of FIG. 11 (i.e. the leftmost available symbol position in the same row R3, since the symbol position C1, R3 already includes a Wild symbol.) The symbol set 1200 includes a randomly selected additional Wild symbol 1212 in column C5 at its corresponding first symbol position (at symbol position C5, R2).

Figure 13:
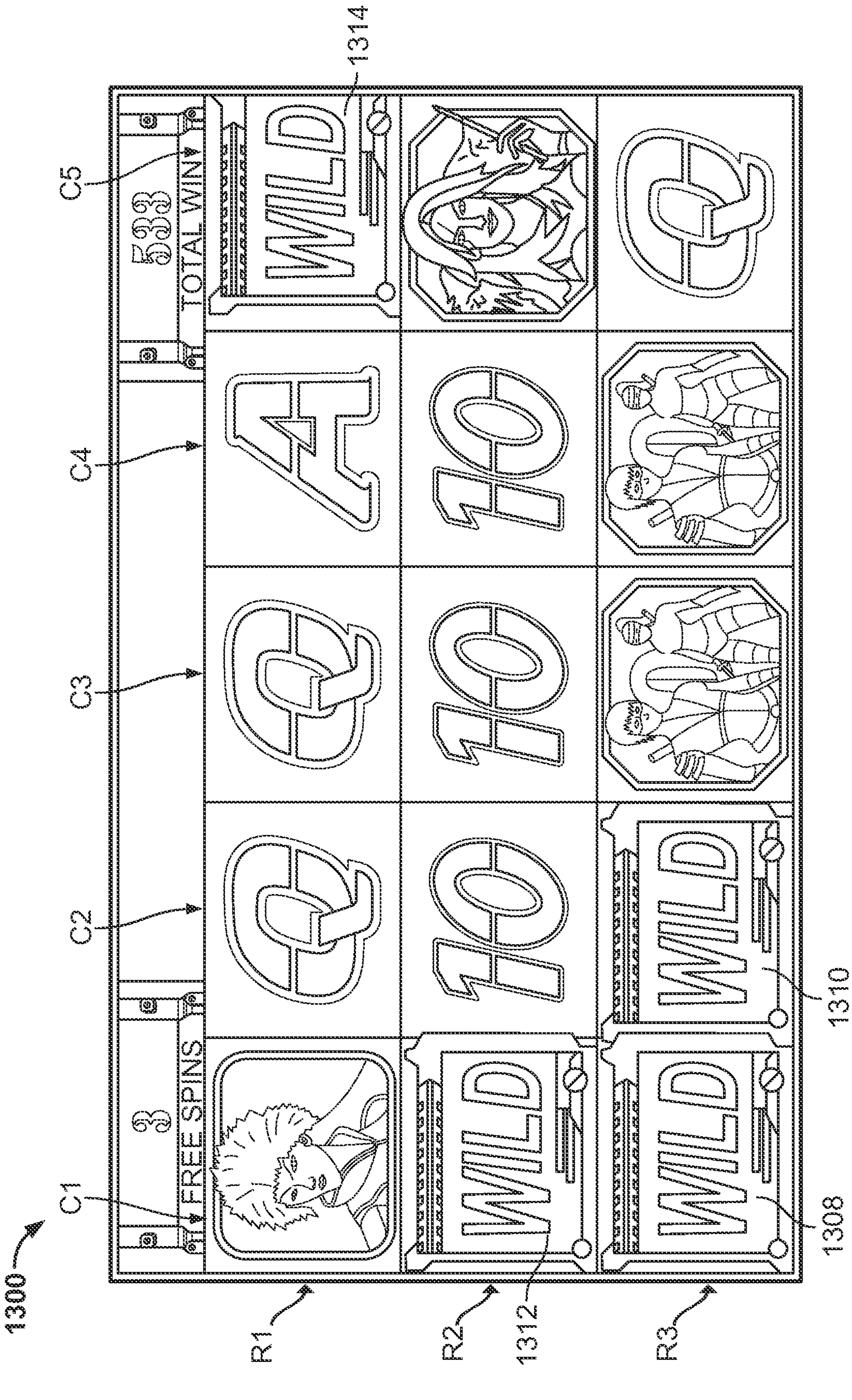
FIG. 13 depicts an example of a determined symbol set displayed by a display in accordance with the embodiments of the disclosure.

FIG. 13 shows another example of a symbol set 1300 during an outcome event following that of FIG. 12. In one example, the symbol set 1300 may include all fifteen depicted instances of symbols in FIG. 13 besides Wild symbols 1308, 1310, and 1312 which remain from previous outcome events and thus were not randomly selected for the outcome event of FIG. 13. Wild symbol 1308 (located at (C1, R3)) has carried over from the outcome events of FIGS. 10-12 (and perhaps from an outcome event intervening between those of FIG. 10 and FIG. 11). Wild symbol 1310 (located at (C2, R3)) has carried over from the outcome event of FIG. 12. Wild symbol 1312 is located at symbol position C1, R2 which is the corresponding second symbol position of Wild symbol 1212 that appeared in the previous bonus outcome event of FIG. 12 (i.e. the leftmost symbol position in the same row R2 of the arrangement). Finally, the symbol set 1300 includes a randomly selected additional Wild symbol 1314 in column C5 at its corresponding first symbol position (at symbol position C5, R1).

In some embodiments, the awarding of bonus outcome events may be a game feature that is one of multiple game features of a given game. In some instances, machine 100 may make a determination that a trigger event occurred (e.g., based on a random selection in a base outcome event or base game as described above). And in response to making the determination, machine 100 may randomly select a game feature from a group of game features. Further, in response to selecting the game feature, the machine may perform the appropriate steps to execute the selected game feature. For example, where the game feature is the one described above, in response to selecting the game feature, machine 100 may make the determination as described above at block 304, and then perform one or more of the other functions described herein in connection with FIGS. 3A-3C to execute the game feature. Note that the group of game features may include a variety of different types of game features.

Machine 100 can cause symbol-display segments to spin, and to cause spinning symbol-display segments to stop spinning. The spinning and stopping of the spinning symbol-display segments can be carried out for each outcome event. In accordance with the embodiments in which the symbol-display-portion 502 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels could occur simultaneously.

IV. ADDITIONAL EXAMPLE OPERATION

Figure 14A:
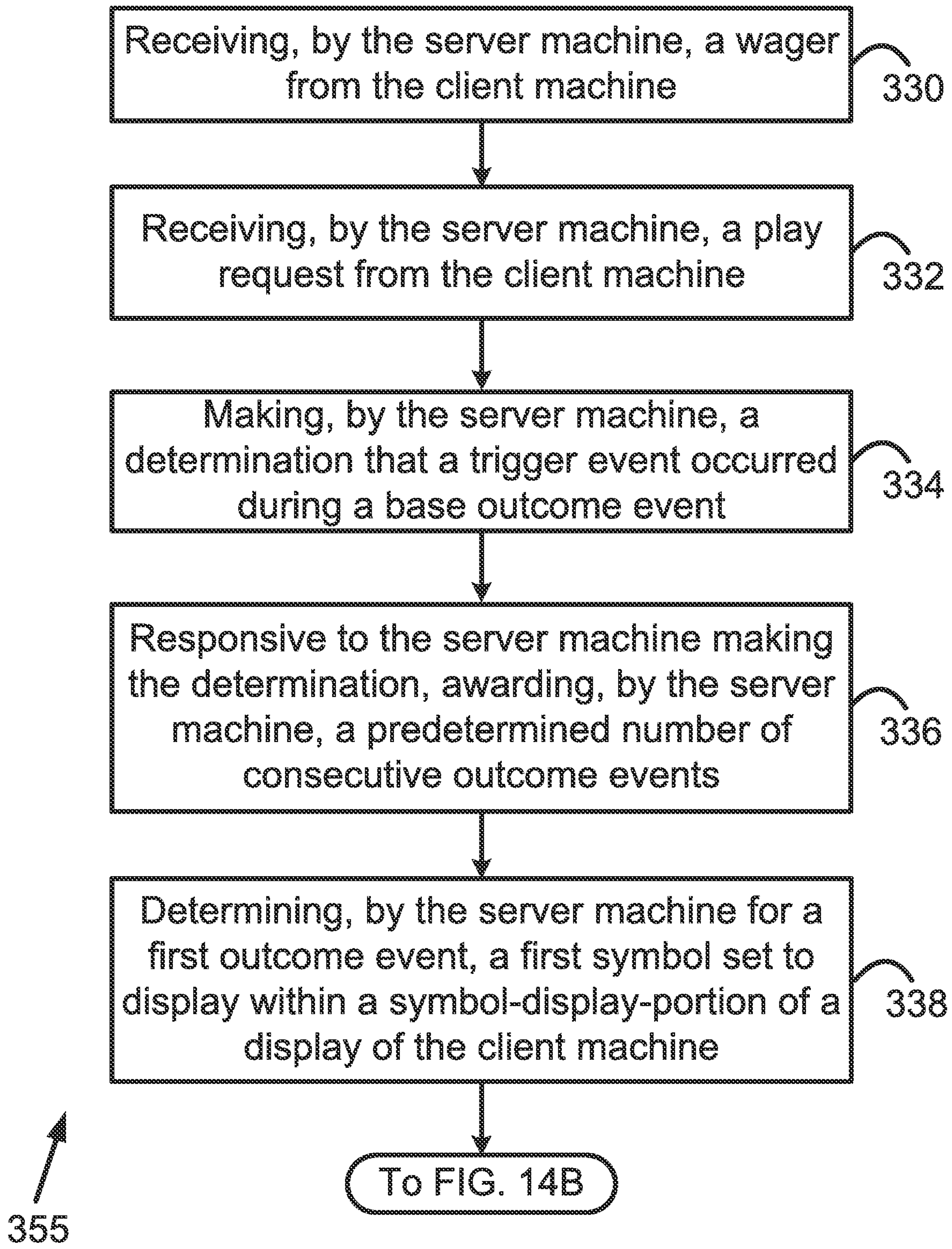
FIG. 14A is a first part of a flow chart showing functions in accordance with a method in an embodiment of the disclosure.
Figure 14B:
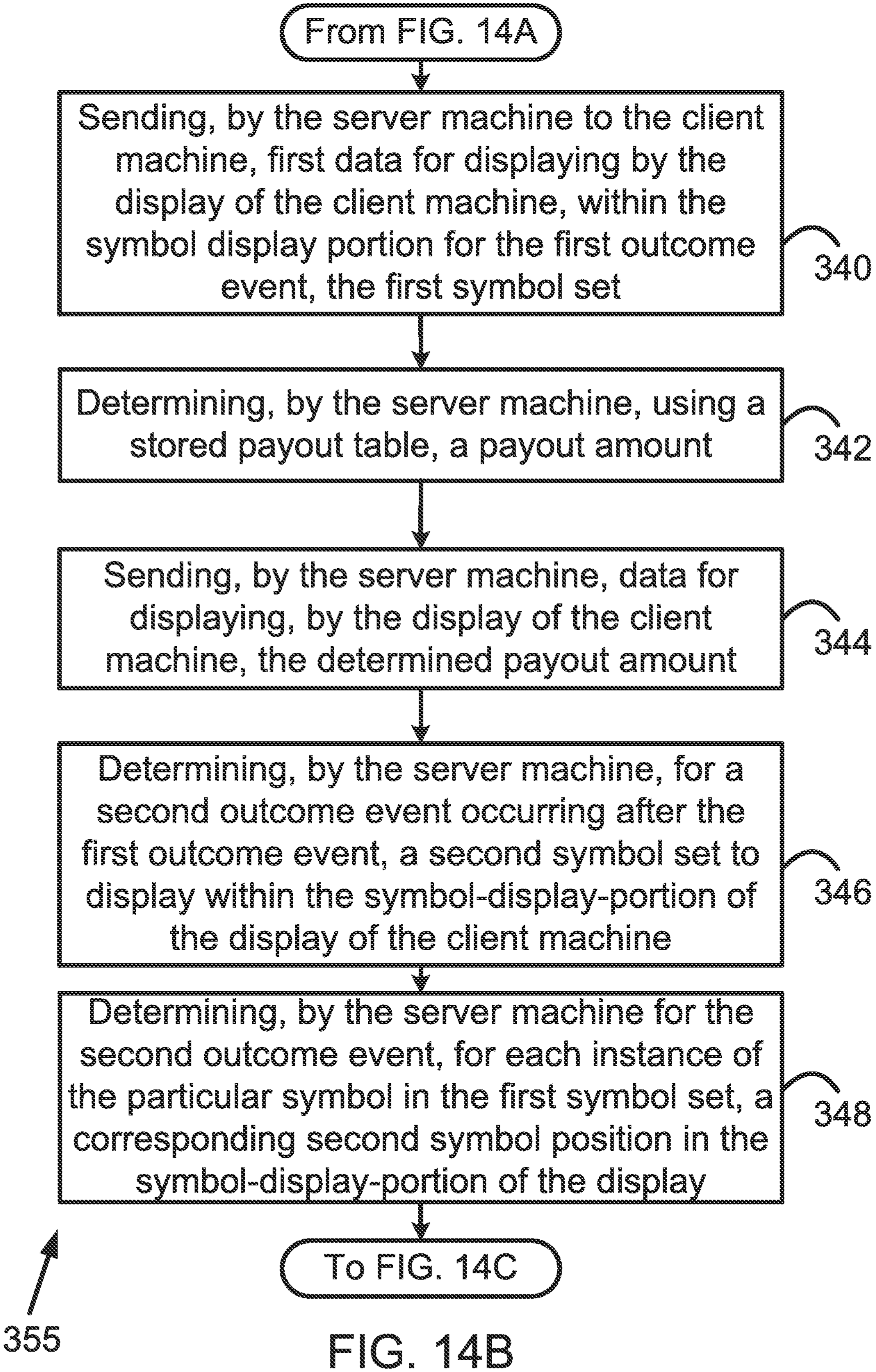
FIG. 14B is a second part of the flow chart of FIG. 14A.
Figure 14C:
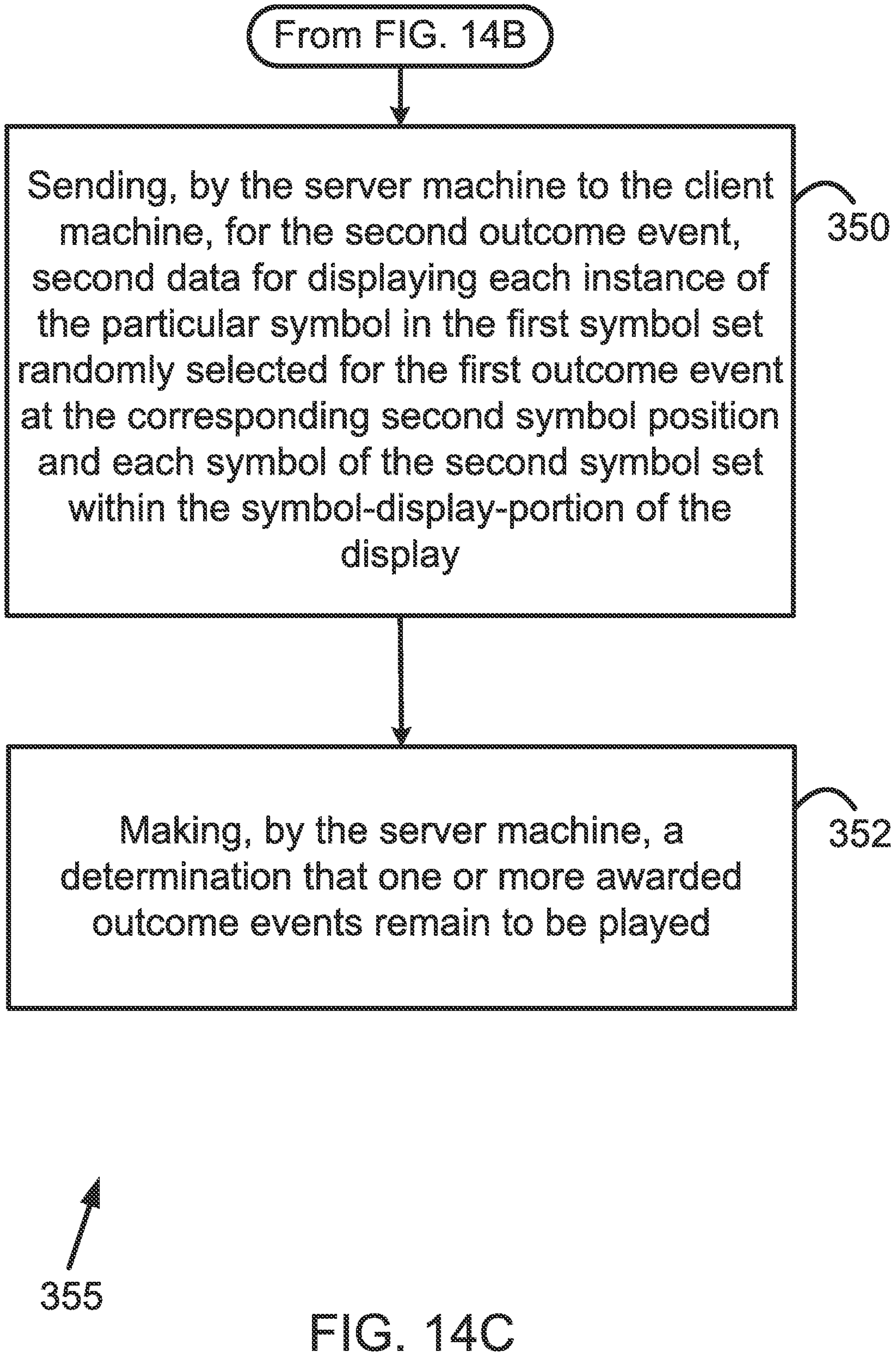
FIG. 14C is a third part of the flow chart of FIG. 14A.

FIG. 14A, FIG. 14B, and FIG. 14C (i.e., FIG. 14A-14C) depict a flowchart showing a set of functions (e.g., operations) 355 (or more simply, "the set 355") that can, for example, be carried out using server machine 100*a*. Note that several of the functions described in connection with FIG. 14A-14C parallel functions described in connection with FIG. 3A-3C. As such, variations of the functions described in connection with FIG. 3A-3C are likewise applicable to the functions described in connection with FIG. 14A-14C. However, for the sake of brevity, these variations are not repeated. The server machine 100*a*, in performing the set 355, can perform the functions described above with respect to machine 100.

Turning to FIG. 14A, block 330 includes receiving, by the server machine 100*a*, a wager from the client machine 100*b*. The server machine 100*a* may receive the wager via its communication interface 102*a*. Block 330 may correspond to block 300 of FIG. 3A in that the wager received from the client machine 100*b* may have been received by a user interface 104*b* of the client machine 100*b*.

Next, block 332 includes receiving, by the server machine 110*a*, a play request from the client machine 100*b*. The server machine 100*a* may receive the play request via its communication interface 102*a*. Block 332 may correspond to block 302 of FIG. 3A in that the play request received from the client machine 100*b* may have been received by a user interface 104*b* of the client machine 100*b*.

Next, block 334 includes making, by the server machine 100*a*, a determination that a trigger event occurred during a base outcome event. Block 334 may be implemented similarly to block 304 of FIG. 3A.

Next, block 336 includes, responsive to the server machine 100*a* making the determination (i.e., the determination of block 334), awarding, by the server machine 100*a*, a predetermined number of consecutive outcome events. Block 336 may be implemented similarly to block 306 of FIG. 3A.

Next, block 338 includes determining, by a server machine for a first outcome event, a first symbol set to display within a symbol-display-portion of a display of a client machine. The first symbol set may include multiple symbols randomly selected from a global symbol set, and the multiple symbols randomly selected from the global symbol set may include at least one instance of a particular symbol randomly selected from the global symbol set. Block 338 may be implemented similarly to block 308 of FIG. 3A.

Turning to FIG. 14B, block 340 includes sending, by the server machine to the client machine, for the first outcome event, first data for displaying the first symbol set including the at least one instance of the particular symbol within the symbol-display-portion of the display. The first data may cause each instance of the particular symbol to be displayed at a corresponding first symbol position within the symbol-display-portion of the display for the first outcome event. Executing block 340 may cause a client machine to display the first symbol set, in similarity with block 310 of FIG. 3B or block 370 of FIG. 15B.

Next, block 342 includes determining, by the server machine 100*a* using a stored payout table, a payout amount. Block 342 may be implemented similarly to block 312 of FIG. 3B.

Next, block 344 includes sending, by the server machine 100*a*, data for displaying, by the display 110*b* of the client machine 100*b*, the determined payout amount. Executing block 344 may cause a client machine to display the payout amount, in similarity with block 314 of FIG. 3B. Block 344 may also be executed in conjunction with block 374 of FIG. 15B.

Next, block 346 includes determining, by the server machine for a second outcome event occurring after the first outcome event, a second symbol set to display within the symbol-display-portion of the display. Each symbol of the second symbol set may be randomly selected from the global symbol set. Block 346 may be implemented similarly to block 316 of FIG. 3A.

Next, block 348 includes determining, by the server machine for the second outcome event, for each instance of the particular symbol in the first symbol set, a corresponding second symbol position in the symbol-display-portion of the display. Block 348 may be implemented similarly to block 320 of FIG. 3C.

Turning to FIG. 14C, block 350 includes sending, by the server machine to the client machine, for the second outcome event, second data for displaying each instance of the particular symbol in the first symbol set randomly selected for the first outcome event at the corresponding second symbol position and each symbol of the second symbol set within the symbol-display-portion of the display. Block 350 may be performed in conjunction with block 376 of FIG. 15B. Executing block 350 may also cause functions similar to block 322 to be performed.

Next, block 352 includes making, by the server machine 100*a*, a determination that one or more awarded outcome events remain to be played. Block 352 may correspond with block 318 of FIG. 3B.

In other words, portions of the set 355 can repeat to carry out distinct outcome events of the predetermined number events. Functions of the set 355 may be performed in response to, or independent of, user input.

Figure 15A:
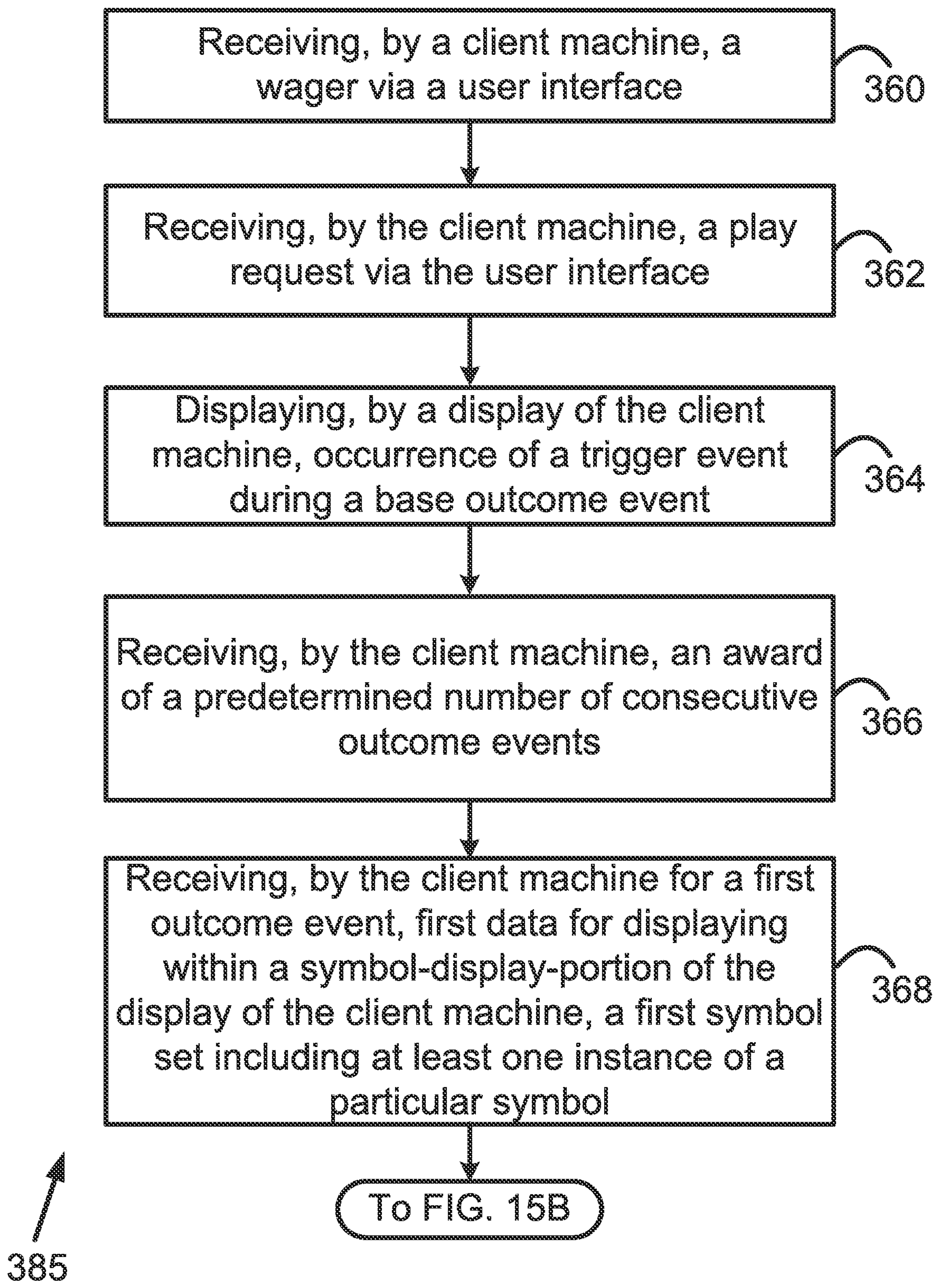
FIG. 15A is a first part of a flow chart showing functions in accordance with a method in an embodiment of the disclosure.
Figure 15B:
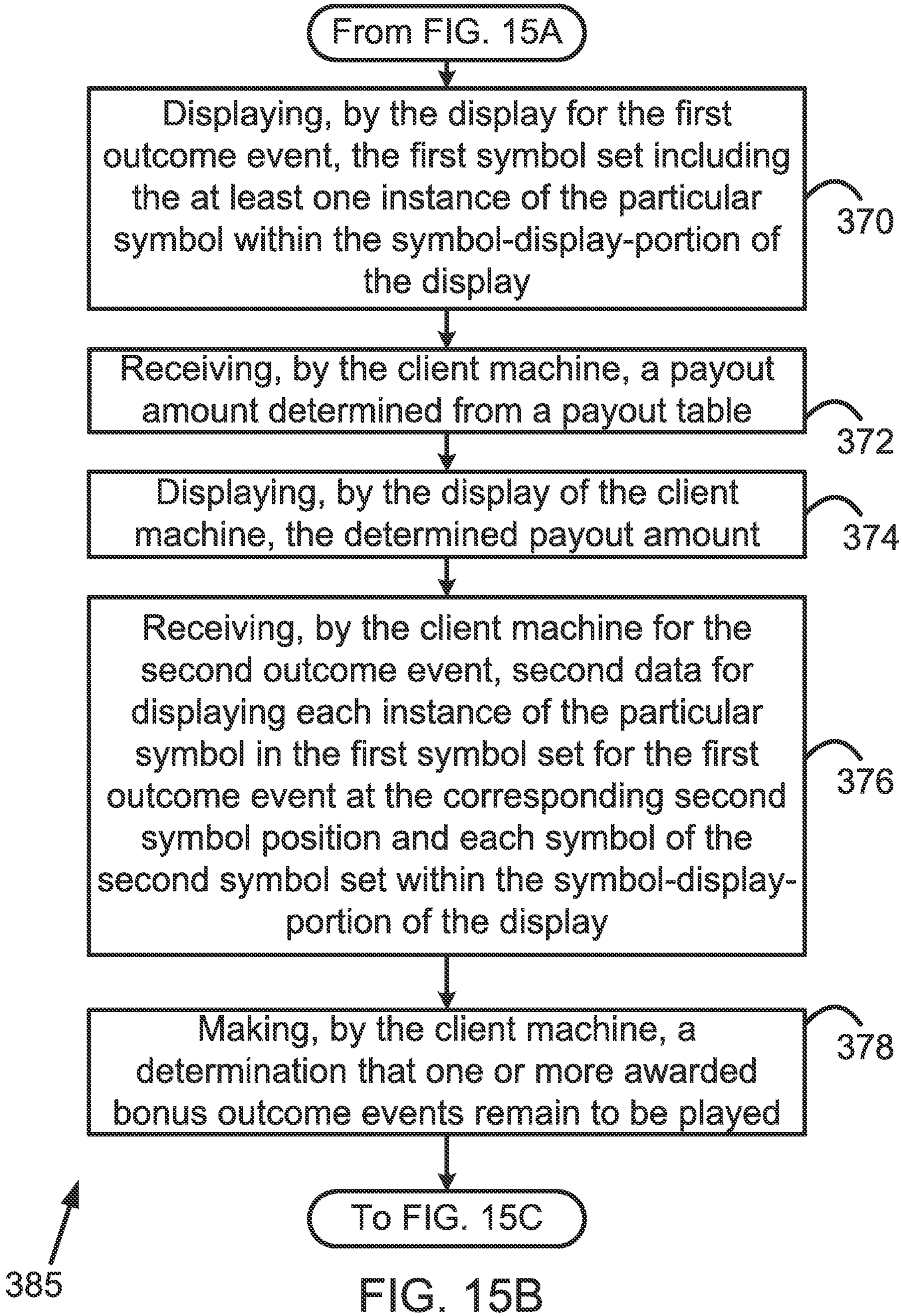
FIG. 15B is a second part of the flow chart of FIG. 15A.
Figure 15C:
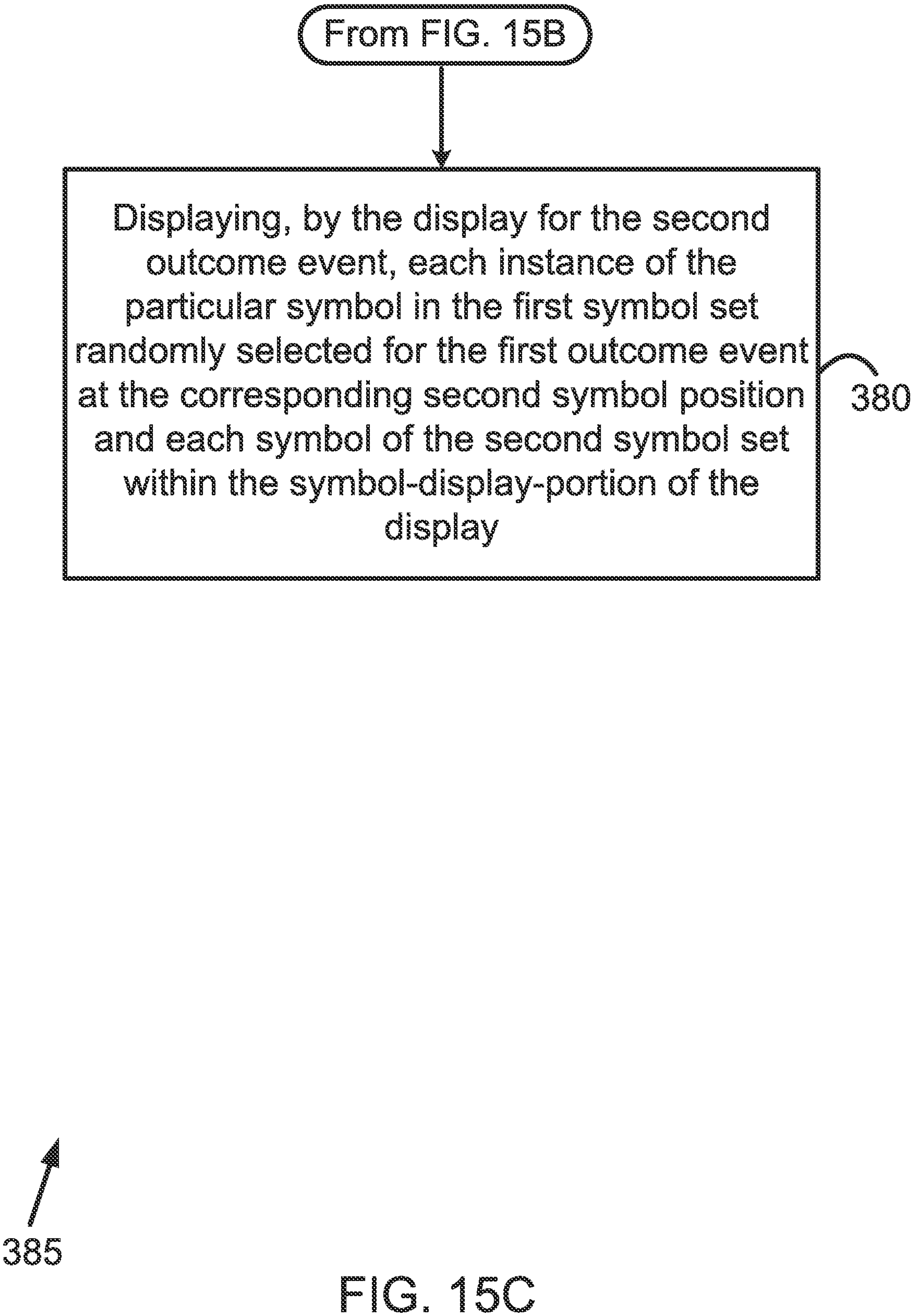
FIG. 15C is a third part of the flow chart of FIG. 15A.

FIG. 15A, FIG. 15B, and FIG. 15C (i.e., FIG. 15A-15C) depict a flowchart showing a set of functions (e.g., operations) 385 (or more simply, "the set 385") that can, for example, be carried out using client machine 100*b*. Note that several of the functions described in connection with FIG. 15A-15C parallel functions described in connection with FIG. 3A-3C and FIG. 14A-14C. As such, variations of the functions described in connection with FIG. 3A-3C and FIG. 14A-14C are likewise applicable to the functions described in connection with FIG. 15A-15C. However, for the sake of brevity, these variations are not repeated. The client machine 100*b*, in performing the set 385, can perform the functions described above with respect to machine 100. Functions of the set 385 may be performed in response to, or independent of, user input.

Turning to FIG. 15A, block 360 includes receiving, by the client machine 100*b*, a wager via the user interface 104*b*. Client machine 100*b* can transmit the received wager or data indicative thereof over the communication network 118 to server machine 100*a*. Block 360 may be implemented similarly to block 300 of FIG. 3A.

Next, block 362 includes receiving, by the client machine 100*b*, a play request via the user interface 104*b*. Client machine 100*b* can transmit the received play request or data indicative thereof over the communication network 118 to server machine 100*a*. Block 362 may be implemented similarly to block 302 of FIG. 3A.

Next, block 364 includes displaying, by a display 110*b* of the client machine 100*b*, occurrence of a trigger event during a base outcome event. Block 364 may be executed in response to performance of block 334 of FIG. 14A.

Next, block 366 includes receiving, by the client machine 100*b*, an award of a predetermined number of consecutive outcome events. Block 366 may be executed in response to performance of block 336 of FIG. 14A.

Next, block 368 includes receiving, by the client machine 100*b* for a first outcome event, first data for displaying within a symbol-display-portion of the display 110*b* of the client machine 100*b*, a first symbol set including at least one instance of a particular symbol. The first data may indicate to display each instance of the particular symbol at a corresponding first symbol position within the symbol-display-portion of the display for the first outcome event. The first symbol set may include multiple symbols randomly selected from a global symbol set, and the multiple symbols randomly selected from the global symbol set may include at least one instance of a particular symbol randomly selected from the global symbol set. Block 368 may be executed in response to performance of block 340 of FIG. 14B.

Turning to FIG. 15B, block 370 includes displaying, by the display for the first outcome event, the first symbol set including the at least one instance of the particular symbol within the symbol-display-portion of the display. Each instance of the particular symbol may be displayed at the corresponding first symbol position within the symbol-display-portion of the display for the first outcome event. Block 370 may be implemented in response to block 340 of FIG. 14B, and similarly to block 310 of FIG. 3B.

Next, block 372 includes receiving, by the client machine 100*b*, a payout amount determined from a payout table. Block 372 may be executed in response to block 344 of FIG. 14B.

Next, block 374 includes displaying, by the display 110*b* of the client machine 100*b*, the determined payout amount. Block 374 may be executed in response to block 344 of FIG. 14B.

Next, block 376 includes receiving, by the client machine for the second outcome event, second data for displaying, by the display, each instance of the particular symbol in the first symbol set randomly selected for the first outcome event at the corresponding second symbol position and each symbol of the second symbol set within the symbol-display-portion of the display. Block 376 may be executed in response to performance of block 350 of FIG. 14C.

Next, block 378 includes making, by the client machine 100*b*, a determination that one or more awarded bonus outcome events remain to be played. Block 378 may be implemented similarly to block 318 of FIG. 3B.

Turning to FIG. 15C, block 380 includes displaying, by the display for the second outcome event, each instance of the particular symbol in the first symbol set randomly selected for the first outcome event at the corresponding second symbol position and each symbol of the second symbol set within the symbol-display-portion of the display. Block 380 may be implemented similarly to block 322 of FIG. 3C.

V. ADDITIONAL EXAMPLE EMBODIMENTS

The following examples set out further or alternative aspects of the disclosure. Any references to items in the Figures or to the Figures themselves are for ease of reference only and are not limiting on the scope of the other examples described herein.

Example 1

A method comprising: determining, by a machine for a first outcome event, a first symbol set to display within a symbol-display-portion of a display of the machine, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the machine for a second outcome event occurring after the first outcome event, a second symbol set to display within the symbol-display-portion of the display, wherein each symbol of the second symbol set is randomly selected from the global symbol set; determining, by the machine for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 2

The method of example 1, wherein the first symbol set is determined by a processor of the machine.

Example 3

The method of any of examples 1 to 2, wherein determining the first symbol set comprises receiving data indicating the first symbol set.

Example 4

The method of any of examples 1 to 2, wherein determining the first symbol set comprises randomly selecting the first symbol set from a global symbol group.

Example 5

The method of any of examples 1 to 4, wherein determining the first symbol set comprises: determining at least one instance of a symbol to be included in the first symbol set; and determining a symbol position within the symbol-display-portion of the display for the at least one instance of a symbol included in the first symbol set.

Example 6

The method of any of examples 1 to 5, wherein displaying, for the first outcome event, the first symbol set comprises displaying the at least one instance of the particular symbol at rest within the symbol-display-portion of the display.

Example 7

The method of any of examples 1 to 6, wherein the corresponding first symbol position is located within a first perimeter column of the symbol-display-portion of the display.

Example 8

The method of example 7, wherein the corresponding first symbol position is located within a rightmost column of the symbol-display-portion of the display.

Example 9

The method of any of examples 1 to 8, wherein the determined corresponding second symbol position is located within a second perimeter column of the symbol-display-portion of the display.

Example 10

The method of example 9, wherein the determined corresponding second symbol position is located within a leftmost column of the symbol-display-portion of the display.

Example 11

The method of any of examples 1 to 8, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 12

The method of any of examples 1 to 6, wherein the corresponding first symbol position is located within a first perimeter row of the symbol-display-portion of the display.

Example 13

The method of example 12, wherein the corresponding first symbol position is located within a topmost row of the symbol-display-portion of the display.

Example 14

The method of any of examples 1 to 6 and 12 to 13, wherein the determined corresponding second symbol position is located within a second perimeter row of the symbol-display-portion of the display.

Example 15

The method of example 14, wherein the corresponding second symbol position is located within a bottommost row of the symbol-display-portion of the display.

Example 16

The method of any of examples 1 to 8, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 17

The method of any of examples 11 or 16, wherein the corresponding second symbol position is adjacent to the given symbol position.

Example 18

The method of any of examples 1 to 17, wherein the determined corresponding second symbol position is located adjacent to the corresponding first symbol position.

Example 19

The method of any of examples 1 to 18, wherein the corresponding first symbol position and the corresponding second symbol position are located at opposite ends of the symbol-display-portion of the display.

Example 20

The method of any of examples 1 to 19, further comprising: determining that a trigger event occurred during an outcome event preceding the first outcome event; and initiating the first outcome event in response to determining that the trigger event has occurred.

Example 21

The method of any of examples 1 to 20, further comprising: determining that bonus outcome events remain to be played; and initiating the first outcome event in response to determining that bonus outcome events remained to be played.

Example 22

The method of any of examples 1 to 21, further comprising displaying each instance of the particular symbol of the first symbol set moving from the first corresponding symbol position to the second corresponding symbol position.

Example 23

The method of any of examples 1 to 22, further comprising: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 24

The method of any of examples 1 to 23, further comprising: determining, using a stored payout table, a payout amount for the first outcome event based at least in part on the determined first symbol set.

Example 25

The method of any of examples 23 to 24, further comprising: determining, using a stored payout table, a payout amount for the second outcome event based at least in part on the determined second symbol set.

Example 26

The method of any of examples 1 to 11 and 17 to 25, further comprising: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 27

The method of any of examples 1 to 11 and 17 to 26, further comprising: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 28

The method of any of examples 26 to 27, wherein the subsequent outcome event is an outcome event that immediately follows the given outcome event.

Example 29

The method of any of examples 1 to 6 and 12 to 25, further comprising: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 30

The method of any of examples 1 to 6, 12 to 25, and 29, further comprising: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 31

The method of any of examples 29 to 30, wherein the subsequent outcome event is an outcome event that immediately follows the given outcome event.

Example 32

A machine comprising: a display configured to display symbols for an outcome event; a processor; and a non-transitory computer readable medium storing program instructions, that when executed by the processor, cause a set of functions to be performed, the set of functions comprising: determining, by the processor for a first outcome event, a first symbol set to display within a symbol-display-portion of the display, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the processor for a second outcome event occurring after the first outcome event, a second symbol set to display within the symbol-display-portion of the display, wherein each symbol of the second symbol set is randomly selected from the global symbol set; determining, by the processor for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 33

The machine of example 32, wherein the first symbol set is determined by a processor of the machine.

Example 34

The machine of any of examples 32 to 33, wherein determining the first symbol set comprises receiving data indicating the first symbol set.

Example 35

The machine of any of examples 32 to 33, wherein determining the first symbol set comprises randomly selecting the first symbol set from a global symbol group.

Example 36

The machine of any of examples 32 to 35, wherein determining the first symbol set comprises: determining at least one instance of a symbol to be included in the first symbol set; and determining a symbol position within the symbol-display-portion of the display for the at least one instance of a symbol included in the first symbol set.

Example 37

The machine of any of examples 32 to 36, wherein displaying, for the first outcome event, the first symbol set comprises displaying the at least one instance of the particular symbol at rest within the symbol-display-portion of the display.

Example 38

The machine of any of examples 32 to 37, wherein the corresponding first symbol position is located within a first perimeter column of the symbol-display-portion of the display.

Example 39

The machine of example 38, wherein the corresponding first symbol position is located within a rightmost column of the symbol-display-portion of the display.

Example 40

The machine of any of examples 32 to 39, wherein the determined corresponding second symbol position is located within a second perimeter column of the symbol-display-portion of the display.

Example 41

The machine of example 40, wherein the determined corresponding second symbol position is located within a leftmost column of the symbol-display-portion of the display.

Example 42

The machine of any of examples 32 to 39, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 43

The machine of any of examples 32 to 37, wherein the corresponding first symbol position is located within a first perimeter row of the symbol-display-portion of the display.

Example 44

The machine of example 43, wherein the corresponding first symbol position is located within a topmost row of the symbol-display-portion of the display.

Example 45

The machine of any of examples 32 to 37 and 43 to 44, wherein the determined corresponding second symbol position is located within a second perimeter row of the symbol-display-portion of the display.

Example 46

The machine of example 45, wherein the corresponding second symbol position is located within a bottommost row of the symbol-display-portion of the display.

Example 47

The machine of any of examples 32 to 39, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 48

The machine of any of examples 42 or 47, wherein the corresponding second symbol position is adjacent to the given symbol position.

Example 49

The machine of any of examples 32 to 48, wherein the determined corresponding second symbol position is located adjacent to the corresponding first symbol position.

Example 50

The machine of any of examples 32 to 49, wherein the corresponding first symbol position and the corresponding second symbol position are located at opposite ends of the symbol-display-portion of the display.

Example 51

The machine of any of examples 32 to 50, wherein the set of functions further comprise: determining that a trigger event occurred during an outcome event preceding the first outcome event; and initiating the first outcome event in response to determining that the trigger event has occurred.

Example 52

The machine of any of examples 32 to 51, wherein the set of functions further comprise: determining that bonus outcome events remain to be played; and initiating the first outcome event in response to determining that bonus outcome events remained to be played.

Example 53

The machine of any of examples 32 to 52, wherein the set of functions further comprise displaying each instance of the particular symbol of the first symbol set moving from the first corresponding symbol position to the second corresponding symbol position.

Example 54

The machine of any of examples 32 to 53, wherein the set of functions further comprise: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 55

The machine of any of examples 32 to 54, wherein the set of functions further comprise: determining, using a stored payout table, a payout amount for the first outcome event based at least in part on the determined first symbol set.

Example 56

The machine of any of examples 54 to 55, wherein the set of functions further comprise: determining, using a stored payout table, a payout amount for the second outcome event based at least in part on the determined second symbol set.

Example 57

The machine of any of examples 32 to 42 and 48 to 56, wherein the set of functions further comprise: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 58

The machine of any of examples 32 to 42 and 48 to 57, wherein the set of functions further comprise: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 59

The machine of any of examples 57 to 58, wherein the subsequent outcome event is an outcome event that immediately follows the given outcome event.

Example 60

The machine of any of examples 32 to 37 and 43 to 56, wherein the set of functions further comprise: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 61

The machine of any of examples 32 to 37, 43 to 56, and 60, wherein the set of functions further comprise: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 62

The machine of any of examples 60 to 61, wherein the subsequent outcome event is an outcome event that immediately follows the given outcome event.

Example 63

A non-transitory computer-readable medium storing program instructions, that when executed by a computing device, cause a set of functions to be performed, the set of functions comprising: determining, by the computing device for a first outcome event, a first symbol set to display within a symbol-display-portion of a display of the machine, wherein the first symbol set includes multiple symbols randomly selected from a global symbol set, and wherein the multiple symbols randomly selected from the global symbol set include at least one instance of a particular symbol randomly selected from the global symbol set; displaying, by a display for the first outcome event, the first symbol set including the at least one instance of the particular symbol within the symbol-display-portion of the display, wherein each instance of the particular symbol is displayed at a corresponding first symbol position within the symbol-display-portion of the display for the first outcome event; determining, by the computing device for a second outcome event occurring after the first outcome event, a second symbol set to display within the symbol-display-portion of the display, wherein each symbol of the second symbol set is randomly selected from the global symbol set; determining, by the computing device for the second outcome event, for each instance of the particular symbol in the first symbol set, a corresponding second symbol position in the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 64

The non-transitory computer-readable medium of example 63, wherein the first symbol set is determined by a processor of the machine.

Example 65

The non-transitory computer-readable medium of any of examples 63 to 64, wherein determining the first symbol set comprises receiving data indicating the first symbol set.

Example 66

The non-transitory computer-readable medium of any of examples 63 to 64, wherein determining the first symbol set comprises randomly selecting the first symbol set from a global symbol group.

Example 67

The non-transitory computer-readable medium of any of examples 63 to 66, wherein determining the first symbol set comprises: determining at least one instance of a symbol to be included in the first symbol set; and determining a symbol position within the symbol-display-portion of the display for the at least one instance of a symbol included in the first symbol set.

Example 68

The non-transitory computer-readable medium of any of examples 63 to 67, wherein displaying, for the first outcome event, the first symbol set comprises displaying the at least one instance of the particular symbol at rest within the symbol-display-portion of the display.

Example 69

The non-transitory computer-readable medium of any of examples 63 to 68, wherein the corresponding first symbol position is located within a first perimeter column of the symbol-display-portion of the display.

Example 70

The non-transitory computer-readable medium of example 69, wherein the corresponding first symbol position is located within a rightmost column of the symbol-display-portion of the display.

Example 71

The non-transitory computer-readable medium of any of examples 63 to 70, wherein the determined corresponding second symbol position is located within a second perimeter column of the symbol-display-portion of the display.

Example 72

The non-transitory computer-readable medium of example 71, wherein the determined corresponding second symbol position is located within a leftmost column of the symbol-display-portion of the display.

Example 73

The non-transitory computer-readable medium of any of examples 63 to 70, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 74

The non-transitory computer-readable medium of any of examples 63 to 68, wherein the corresponding first symbol position is located within a first perimeter row of the symbol-display-portion of the display.

Example 75

The non-transitory computer-readable medium of example 74, wherein the corresponding first symbol position is located within a topmost row of the symbol-display-portion of the display.

Example 76

The non-transitory computer-readable medium of any of examples 63 to 68 and 74 to 75, wherein the determined corresponding second symbol position is located within a second perimeter row of the symbol-display-portion of the display.

Example 77

The non-transitory computer-readable medium of example 76, wherein the corresponding second symbol position is located within a bottommost row of the symbol-display-portion of the display.

Example 78

The non-transitory computer-readable medium of any of examples 63 to 70, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 79

The non-transitory computer-readable medium of any of examples 73 or 78, wherein the corresponding second symbol position is adjacent to the given symbol position.

Example 80

The non-transitory computer-readable medium of any of examples 63 to 79, wherein the determined corresponding second symbol position is located adjacent to the corresponding first symbol position.

Example 81

The non-transitory computer-readable medium of any of examples 63 to 80, wherein the corresponding first symbol position and the corresponding second symbol position are located at opposite ends of the symbol-display-portion of the display.

Example 82

The non-transitory computer-readable medium of any of examples 63 to 81, wherein the set of functions further comprises: determining that a trigger event occurred during an outcome event preceding the first outcome event; and initiating the first outcome event in response to determining that the trigger event has occurred.

Example 83

The non-transitory computer-readable medium of any of examples 63 to 82, wherein the set of functions further comprises: determining that bonus outcome events remain to be played; and initiating the first outcome event in response to determining that bonus outcome events remained to be played.

Example 84

The non-transitory computer-readable medium of any of examples 63 to 83, wherein the set of functions further comprises displaying each instance of the particular symbol of the first symbol set moving from the first corresponding symbol position to the second corresponding symbol position.

Example 85

The non-transitory computer-readable medium of any of examples 63 to 84, wherein the set of functions further comprises: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 86

The non-transitory computer-readable medium of any of examples 63 to 85, wherein the set of functions further comprises: determining, using a stored payout table, a payout amount for the first outcome event based at least in part on the determined first symbol set.

Example 87

The non-transitory computer-readable medium of any of examples 23 to 86, wherein the set of functions further comprises: determining, using a stored payout table, a payout amount for the second outcome event based at least in part on the determined second symbol set.

Example 88

The non-transitory computer-readable medium of any of examples 63 to 74 and 79 to 87, wherein the set of functions further comprises: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 89

The non-transitory computer-readable medium of any of examples 63 to 73 and 80 to 88, wherein the set of functions further comprises: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 90

The non-transitory computer-readable medium of any of examples 88 to 89, wherein the subsequent outcome event is an outcome event that immediately follows the given outcome event.

Example 91

The non-transitory computer-readable medium of any of examples 63 to 68 and 74 to 87, wherein the set of functions further comprises: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 92

The non-transitory computer-readable medium of any of examples 63 to 68, 74 to 87, and 91, wherein the set of functions further comprises: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 93

The non-transitory computer-readable medium of any of examples 91 to 92, wherein the subsequent outcome event is an outcome event that immediately follows the given outcome event.

Example 94

A method comprising: determining, by a server machine for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by a communication interface of the server machine to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the server machine for a second outcome event occurring after the first outcome event, a second symbol set to display within the symbol-display-portion of the display, wherein each symbol of the second symbol set is randomly selected from the global symbol set; determining, by the server machine for the second outcome event, for each instance of the particular symbol in the first symbol set, a corresponding second symbol position in the symbol-display-portion of the display; and sending, by a communication interface of the server machine to the client machine, for the second outcome event, second data for displaying each instance of the particular symbol in the first symbol set randomly selected for the first outcome event at the corresponding second symbol position and each symbol of the second symbol set within the symbol-display-portion of the display.

Example 95

The method of example 94, wherein the first symbol set is determined by a processor of the server machine.

Example 96

The method of any of examples 94 to 95, wherein determining the first symbol set comprises receiving data indicating the first symbol set.

Example 97

The method of any of examples 94 to 95, wherein determining the first symbol set comprises randomly selecting the first symbol set from a global symbol group.

Example 98

The method of any of examples 94 to 97, wherein determining the first symbol set comprises: determining at least one instance of a symbol to be included in the first symbol set; and determining a symbol position within the symbol-display-portion of the display for the at least one instance of a symbol included in the first symbol set.

Example 99

The method of any of examples 94 to 98, wherein displaying, for the first outcome event, the first symbol set comprises displaying the at least one instance of the particular symbol at rest within the symbol-display-portion of the display.

Example 100

The method of any of examples 94 to 99, wherein the corresponding first symbol position is located within a first perimeter column of the symbol-display-portion of the display.

Example 101

The method of example 100, wherein the corresponding first symbol position is located within a rightmost column of the symbol-display-portion of the display.

Example 102

The method of any of examples 94 to 101, wherein the determined corresponding second symbol position is located within a second perimeter column of the symbol-display-portion of the display.

Example 103

The method of example 102, wherein the determined corresponding second symbol position is located within a leftmost column of the symbol-display-portion of the display.

Example 104

The method of any of examples 94 to 101, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 105

The method of any of examples 94 to 99, wherein the corresponding first symbol position is located within a first perimeter row of the symbol-display-portion of the display.

Example 106

The method of example 105, wherein the corresponding first symbol position is located within a topmost row of the symbol-display-portion of the display.

Example 107

The method of any of examples 94 to 99 and 105 to 106, wherein the determined corresponding second symbol position is located within a second perimeter row of the symbol-display-portion of the display.

Example 108

The method of example 107, wherein the corresponding second symbol position is located within a bottommost row of the symbol-display-portion of the display.

Example 109

The method of any of examples 94 to 101, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 110

The method of any of examples 104 or 109, wherein the corresponding second symbol position is adjacent to the given symbol position.

Example 111

The method of any of examples 94 to 110, wherein the determined corresponding second symbol position is located adjacent to the corresponding first symbol position.

Example 112

The method of any of examples 94 to 111, wherein the corresponding first symbol position and the corresponding second symbol position are located at opposite ends of the symbol-display-portion of the display.

Example 113

The method of any of examples 94 to 112, further comprising: determining that a trigger event occurred during an outcome event preceding the first outcome event; and initiating the first outcome event in response to determining that the trigger event has occurred.

Example 114

The method of any of examples 94 to 113, further comprising: determining that bonus outcome events remain to be played; and initiating the first outcome event in response to determining that bonus outcome events remained to be played.

Example 115

The method of any of examples 94 to 114, further comprising displaying each instance of the particular symbol of the first symbol set moving from the first corresponding symbol position to the second corresponding symbol position.

Example 116

The method of any of examples 94 to 115, further comprising: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 117

The method of any of examples 94 to 116, further comprising: determining, using a stored payout table, a payout amount for the first outcome event based at least in part on the determined first symbol set.

Example 118

The method of any of examples 23 to 117, further comprising: determining, using a stored payout table, a payout amount for the second outcome event based at least in part on the determined second symbol set.

Example 119

The method of any of examples 94 to 104 and 110 to 118, further comprising: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 120

The method of any of examples 94 to 104 and 110 to 119, further comprising: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 121

The method of any of examples 119 to 120, wherein the subsequent outcome event is an outcome event that immediately follows the given outcome event.

Example 122

The method of any of examples 94 to 99 and 105 to 118, further comprising: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 123

The method of any of examples 94 to 99, 105 to 118, and 122, further comprising: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 124

The method of any of examples 122 to 123, wherein the subsequent outcome event is an outcome event that immediately follows the given outcome event.

Example 125

A server machine comprising: a processor; a communication interface; and a non-transitory computer readable medium storing program instructions, that when executed by the processor, cause a set of functions to be performed, the set of functions comprising: determining, by the processor for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by the communication interface to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the processor for a second outcome event occurring after the first outcome event, a second symbol set to display within the symbol-display-portion of the display, wherein each symbol of the second symbol set is randomly selected from the global symbol set; determining, by the server machine for the second outcome event, for each instance of the particular symbol in the first symbol set, a corresponding second symbol position in the symbol-display-portion of the display; and sending, by the communication interface to the client machine, for the second outcome event, second data for displaying each instance of the particular symbol in the first symbol set randomly selected for the first outcome event at the corresponding second symbol position and each symbol of the second symbol set within the symbol-display-portion of the display.

Example 126

The server machine of example 125, wherein the first symbol set is determined by a processor of the server machine.

Example 127

The server machine of any of examples 125 to 126, wherein determining the first symbol set comprises receiving data indicating the first symbol set.

Example 128

The server machine of any of examples 125 to 126, wherein determining the first symbol set comprises randomly selecting the first symbol set from a global symbol group.

Example 129

The server machine of any of examples 125 to 128, wherein determining the first symbol set comprises: determining at least one instance of a symbol to be included in the first symbol set; and determining a symbol position within the symbol-display-portion of the display for the at least one instance of a symbol included in the first symbol set.

Example 130

The server machine of any of examples 125 to 129, wherein displaying, for the first outcome event, the first symbol set comprises displaying the at least one instance of the particular symbol at rest within the symbol-display-portion of the display.

Example 131

The server machine of any of examples 125 to 130, wherein the corresponding first symbol position is located within a first perimeter column of the symbol-display-portion of the display.

Example 132

The server machine of example 131, wherein the corresponding first symbol position is located within a rightmost column of the symbol-display-portion of the display.

Example 133

The server machine of any of examples 125 to 132, wherein the determined corresponding second symbol position is located within a second perimeter column of the symbol-display-portion of the display.

Example 134

The server machine of example 133, wherein the determined corresponding second symbol position is located within a leftmost column of the symbol-display-portion of the display.

Example 135

The server machine of any of examples 125 to 132, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 136

The server machine of any of examples 125 to 130, wherein the corresponding first symbol position is located within a first perimeter row of the symbol-display-portion of the display.

Example 137

The server machine of example 136, wherein the corresponding first symbol position is located within a topmost row of the symbol-display-portion of the display.

Example 138

The server machine of any of examples 125 to 130 and 136 to 137, wherein the determined corresponding second symbol position is located within a second perimeter row of the symbol-display-portion of the display.

Example 139

The server machine of example 138, wherein the corresponding second symbol position is located within a bottommost row of the symbol-display-portion of the display.

Example 140

The server machine of any of examples 125 to 132, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 141

The server machine of any of examples 135 to 140, wherein the corresponding second symbol position is adjacent to the given symbol position.

Example 142

The server machine of any of examples 125 to 141, wherein the determined corresponding second symbol position is located adjacent to the corresponding first symbol position.

Example 143

The server machine of any of examples 125 to 142, wherein the corresponding first symbol position and the corresponding second symbol position are located at opposite ends of the symbol-display-portion of the display.

Example 144

The server machine of any of examples 125 to 143, wherein the set of functions further comprises: determining that a trigger event occurred during an outcome event preceding the first outcome event; and initiating the first outcome event in response to determining that the trigger event has occurred.

Example 145

The server machine of any of examples 125 to 144, wherein the set of functions further comprises: determining that bonus outcome events remain to be played; and initiating the first outcome event in response to determining that bonus outcome events remained to be played.

Example 146

The server machine of any of examples 125 to 145, wherein the set of functions further comprises displaying each instance of the particular symbol of the first symbol set moving from the first corresponding symbol position to the second corresponding symbol position.

Example 147

The server machine of any of examples 125 to 146, wherein the set of functions further comprises: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 148

The server machine of any of examples 125 to 147, wherein the set of functions further comprises: determining, using a stored payout table, a payout amount for the first outcome event based at least in part on the determined first symbol set.

Example 149

The server machine of any of examples 147 to 148, wherein the set of functions further comprises: determining, using a stored payout table, a payout amount for the second outcome event based at least in part on the determined second symbol set.

Example 150

The server machine of any of examples 125 to 135 and 141 to 149, wherein the set of functions further comprises: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 151

The server machine of any of examples 125 to 135 and 141 to 150, wherein the set of functions further comprises: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 152

The server machine of any of examples 150 to 151, wherein the subsequent outcome event is an outcome event that immediately follows the given outcome event.

Example 153

The server machine of any of examples 125 to 130 and 136 to 149, wherein the set of functions further comprises: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 154

The server machine of any of examples 125 to 130, 136 to 149, and 153, wherein the set of functions further comprises: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 155

The server machine of any of examples 153 to 154, wherein the subsequent outcome event is an outcome event that immediately follows the given outcome event.

Example 156

A non-transitory computer-readable medium storing program instructions, that when executed by a server machine, cause a set of functions to be performed, the set of functions comprising: determining, by the server machine for a first outcome event, a first symbol set to display within a symbol-display-portion of a display of a client machine, wherein the first symbol set includes multiple symbols randomly selected from a global symbol set, and wherein the multiple symbols randomly selected from the global symbol set include at least one instance of a particular symbol randomly selected from the global symbol set; sending, by a communication interface of the server machine to the client machine, for the first outcome event, first data for displaying the first symbol set including the at least one instance of the particular symbol within the symbol-display-portion of the display, and for displaying each instance of the particular symbol at a corresponding first symbol position within the symbol-display-portion of the display for the first outcome event; determining, by the server machine for a second outcome event occurring after the first outcome event, a second symbol set to display within the symbol-display-portion of the display, wherein each symbol of the second symbol set is randomly selected from the global symbol set; determining, by the server machine for the second outcome event, for each instance of the particular symbol in the first symbol set, a corresponding second symbol position in the symbol-display-portion of the display; and sending, by the communication interface to the client machine, for the second outcome event, second data for displaying each instance of the particular symbol in the first symbol set randomly selected for the first outcome event at the corresponding second symbol position and each symbol of the second symbol set within the symbol-display-portion of the display.

Example 157

The non-transitory computer-readable medium of example 156, wherein the first symbol set is determined by a processor of the server machine.

Example 158

The non-transitory computer-readable medium of any of examples 156 to 157, wherein determining the first symbol set comprises receiving data indicating the first symbol set.

Example 159

The non-transitory computer-readable medium of any of examples 156 to 157, wherein determining the first symbol set comprises randomly selecting the first symbol set from a global symbol group.

Example 160

The non-transitory computer-readable medium of any of examples 156 to 159, wherein determining the first symbol set comprises: determining at least one instance of a symbol to be included in the first symbol set; and determining a symbol position within the symbol-display-portion of the display for the at least one instance of a symbol included in the first symbol set.

Example 161

The non-transitory computer-readable medium of any of examples 156 to 160, wherein displaying, for the first outcome event, the first symbol set comprises displaying the at least one instance of the particular symbol at rest within the symbol-display-portion of the display.

Example 162

The non-transitory computer-readable medium of any of examples 156 to 161, wherein the corresponding first symbol position is located within a first perimeter column of the symbol-display-portion of the display.

Example 163

The non-transitory computer-readable medium of example 162, wherein the corresponding first symbol position is located within a rightmost column of the symbol-display-portion of the display.

Example 164

The non-transitory computer-readable medium of any of examples 156 to 163, wherein the determined corresponding second symbol position is located within a second perimeter column of the symbol-display-portion of the display.

Example 165

The non-transitory computer-readable medium of example 164, wherein the determined corresponding second symbol position is located within a leftmost column of the symbol-display-portion of the display.

Example 166

The non-transitory computer-readable medium of any of examples 156 to 163, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

Example 167

The non-transitory computer-readable medium of any of examples 156 to 161, wherein the corresponding first symbol position is located within a first perimeter row of the symbol-display-portion of the display.

Example 168

The non-transitory computer-readable medium of example 167, wherein the corresponding first symbol position is located within a topmost row of the symbol-display-portion of the display.

Example 169

The non-transitory computer-readable medium of any of examples 156 to 161 and 167 to 168, wherein the determined corresponding second symbol position is located within a second perimeter row of the symbol-display-portion of the display.

Example 170

The non-transitory computer-readable medium of example 169, wherein the corresponding second symbol position is located within a bottommost row of the symbol-display-portion of the display.

Example 171

The non-transitory computer-readable medium of any of examples 156 to 163, wherein determining, for the second outcome event, for each instance of the particular symbol in the first symbol set, the corresponding second symbol position in the symbol-display-portion of the display comprises: determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

Example 172

The non-transitory computer-readable medium of any of examples 166 or 171, wherein the corresponding second symbol position is adjacent to the given symbol position.

Example 173

The non-transitory computer-readable medium of any of examples 156 to 172, wherein the determined corresponding second symbol position is located adjacent to the corresponding first symbol position.

Example 174

The non-transitory computer-readable medium of any of examples 156 to 173, wherein the corresponding first symbol position and the corresponding second symbol position are located at opposite ends of the symbol-display-portion of the display.

Example 175

The non-transitory computer-readable medium of any of examples 156 to 174, wherein the set of functions further comprises: determining that a trigger event occurred during an outcome event preceding the first outcome event; and initiating the first outcome event in response to determining that the trigger event has occurred.

Example 176

The non-transitory computer-readable medium of any of examples 156 to 175, wherein the set of functions further comprises: determining that bonus outcome events remain to be played; and initiating the first outcome event in response to determining that bonus outcome events remained to be played.

Example 177

The non-transitory computer-readable medium of any of examples 156 to 176, wherein the set of functions further comprises displaying each instance of the particular symbol of the first symbol set moving from the first corresponding symbol position to the second corresponding symbol position.

Example 178

The non-transitory computer-readable medium of any of examples 156 to 177, wherein the set of functions further comprises: determining, for the second outcome event, a second symbol set, based on the determined first symbol set, wherein the second symbol set includes a number of instances of symbols equal to a number of instances of symbols of the first symbol set less a number of instances of the particular symbol of the first symbol set.

Example 179

The non-transitory computer-readable medium of any of examples 156 to 178, wherein the set of functions further comprises: determining, using a stored payout table, a payout amount for the first outcome event based at least in part on the determined first symbol set.

Example 180

The non-transitory computer-readable medium of any of examples 178 to 179, wherein the set of functions further comprises: determining, using a stored payout table, a payout amount for the second outcome event based at least in part on the determined second symbol set.

Example 181

The non-transitory computer-readable medium of any of examples 156 to 166 and 172 to 180, wherein the set of functions further comprises: determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

Example 182

The non-transitory computer-readable medium of any of examples 156 to 166 and 172 to 181, wherein the set of functions further comprises: determining, for a given outcome event, that a given column of the symbol-display-portion of the display is occupied, at every symbol position of the given column, by instances of the particular symbol; determining a payout amount for the given outcome event; and causing, for a subsequent outcome event, the instances of the particular symbol occupying the entire given column to be removed from the display.

Example 183

The non-transitory computer-readable medium of any of examples 181 to 182, wherein the subsequent outcome event is an outcome event that immediately follows the given outcome event.

Example 184

The non-transitory computer-readable medium of any of examples 156 to 161 and 167 to 180, wherein the set of functions further comprises: determining, for a given outcome event, that a given row of the symbol-display-portion of the display contains, at least one instance of a symbol that is not the particular symbol; and displaying, for a subsequent outcome event, each given instance of the particular symbol displayed within the given row at a symbol position that the given instance of the particular symbol occupied during the given outcome event.

Example 185

The non-transitory computer-readable medium of any of examples 156 to 161, 167 to 180, and 184, wherein the set of functions further comprises: determining, for a given outcome event, that a given row of the symbol-display-portion of the display is occupied, at every symbol position of the given row, by instances of the particular symbol; determining a payout amount for the given outcome event; and causing, for a subsequent outcome event, the instances of the particular symbol occupying the entire given row to be removed from the display.

Example 186

The non-transitory computer-readable medium of any of examples 184 to 185, wherein the subsequent outcome event is an outcome event that immediately follows the given outcome event.

Example 187

A method comprising: receiving, by a client machine for a first outcome event, first data for displaying within a symbol-display-portion of a display of the client machine, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the client machine for the second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 188

The method of example 187, wherein displaying, for the first outcome event, the first symbol set comprises displaying the at least one instance of the particular symbol at rest within the symbol-display-portion of the display.

Example 189

The method of any of examples 187 to 188, wherein the corresponding first symbol position is located within a first perimeter column of the symbol-display-portion of the display.

Example 190

The method of example 189, wherein the corresponding first symbol position is located within a rightmost column of the symbol-display-portion of the display.

Example 191

The method of any of examples 187 to 190, wherein the corresponding second symbol position is located within a second perimeter column of the symbol-display-portion of the display.

Example 192

The method of example 191, wherein the corresponding second symbol position is located within a leftmost column of the symbol-display-portion of the display.

Example 193

The method of any of examples 187 to 188, wherein the corresponding first symbol position is located within a first perimeter row of the symbol-display-portion of the display.

Example 194

The method of example 193, wherein the corresponding first symbol position is located within a topmost row of the symbol-display-portion of the display.

Example 195

The method of any of examples 187 to 188 and 193 to 194, wherein the determined corresponding second symbol position is located within a second perimeter row of the symbol-display-portion of the display.

Example 196

The method of example 195, wherein the corresponding second symbol position is located within a bottommost row of the symbol-display-portion of the display.

Example 197

The method of any of examples 187 to 196, wherein the determined corresponding second symbol position is located adjacent to the corresponding first symbol position.

Example 198

The method of any of examples 187 to 197, wherein the corresponding first symbol position and the corresponding second symbol position are located at opposite ends of the symbol-display-portion of the display.

Example 199

The method of any of examples 187 to 198, further comprising displaying each instance of the particular symbol of the first symbol set moving from the first corresponding symbol position to the second corresponding symbol position.

Example 200

A client machine comprising: a display configured to display symbols for an outcome event; a processor; a communication interface; and a non-transitory computer readable medium storing program instructions, that when executed by the processor, cause a set of functions to be performed, the set of functions comprising: receiving, by the communication interface for a first outcome event, first data for displaying within a symbol-display-portion of the display, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the communication interface for a second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 201

The client machine of example 200, wherein displaying, for the first outcome event, the first symbol set comprises displaying the at least one instance of the particular symbol at rest within the symbol-display-portion of the display.

Example 202

The client machine of any of examples 200 to 201, wherein the corresponding first symbol position is located within a first perimeter column of the symbol-display-portion of the display.

Example 203

The client machine of example 202, wherein the corresponding first symbol position is located within a rightmost column of the symbol-display-portion of the display.

Example 204

The client machine of any of examples 200 to 203, wherein the corresponding second symbol position is located within a second perimeter column of the symbol-display-portion of the display.

Example 205

The client machine of example 204, wherein the corresponding second symbol position is located within a leftmost column of the symbol-display-portion of the display.

Example 206

The client machine of any of examples 200 to 201, wherein the corresponding first symbol position is located within a first perimeter row of the symbol-display-portion of the display.

Example 207

The client machine of example 206, wherein the corresponding first symbol position is located within a topmost row of the symbol-display-portion of the display.

Example 208

The client machine of any of examples 200 to 201 and 206 to 207, wherein the determined corresponding second symbol position is located within a second perimeter row of the symbol-display-portion of the display.

Example 209

The client machine of example 208, wherein the corresponding second symbol position is located within a bottommost row of the symbol-display-portion of the display.

Example 210

The client machine of any of examples 200 to 209, wherein the determined corresponding second symbol position is located adjacent to the corresponding first symbol position.

Example 211

The client machine of any of examples 200 to 210, wherein the corresponding first symbol position and the corresponding second symbol position are located at opposite ends of the symbol-display-portion of the display.

Example 212

The client machine of any of examples 200 to 211, wherein the set of functions further comprises displaying each instance of the particular symbol of the first symbol set moving from the first corresponding symbol position to the second corresponding symbol position.

Example 213

A non-transitory computer-readable medium storing program instructions, that when executed by a client machine, cause a set of functions to be performed, the set of functions comprising: receiving, by a client machine for a first outcome event, first data for displaying within a symbol-display-portion of a display of the client machine, a first symbol set including at least one instance of a particular symbol, wherein the first data indicates to display each instance of the particular symbol at a corresponding first symbol position within the symbol-display-portion of the display for the first outcome event, wherein the first symbol set includes multiple symbols randomly selected from a global symbol set, and wherein the multiple symbols randomly selected from the global symbol set include at least one instance of a particular symbol randomly selected from the global symbol set; displaying, by the display for the first outcome event, the first symbol set including the at least one instance of the particular symbol within the symbol-display-portion of the display, wherein each instance of the particular symbol is displayed at the corresponding first symbol position within the symbol-display-portion of the display for the first outcome event; receiving, by the client machine for the second outcome event, second data for displaying, by the display, each instance of the particular symbol in the first symbol set randomly selected for the first outcome event at the corresponding second symbol position and each symbol of the second symbol set within the symbol-display-portion of the display; and displaying, by the display for the second outcome event, each instance of the particular symbol in the first symbol set randomly selected for the first outcome event at the corresponding second symbol position and each symbol of the second symbol set within the symbol-display-portion of the display.

Example 214

The non-transitory computer-readable medium of example 213, wherein displaying, for the first outcome event, the first symbol set comprises displaying the at least one instance of the particular symbol at rest within the symbol-display-portion of the display.

Example 215

The non-transitory computer-readable medium of any of examples 213 to 214, wherein the corresponding first symbol position is located within a first perimeter column of the symbol-display-portion of the display.

Example 216

The non-transitory computer-readable medium of example 215, wherein the corresponding first symbol position is located within a rightmost column of the symbol-display-portion of the display.

Example 217

The non-transitory computer-readable medium of any of examples 213 to 216, wherein the corresponding second symbol position is located within a second perimeter column of the symbol-display-portion of the display.

Example 218

The non-transitory computer-readable medium of example 217, wherein the corresponding second symbol position is located within a leftmost column of the symbol-display-portion of the display.

Example 219

The non-transitory computer-readable medium of any of examples 213 to 214, wherein the corresponding first symbol position is located within a first perimeter row of the symbol-display-portion of the display.

Example 220

The non-transitory computer-readable medium of example 219, wherein the corresponding first symbol position is located within a topmost row of the symbol-display-portion of the display.

Example 221

The non-transitory computer-readable medium of any of examples 213 to 214 and 219 to 220, wherein the determined corresponding second symbol position is located within a second perimeter row of the symbol-display-portion of the display.

Example 222

The non-transitory computer-readable medium of example 221, wherein the corresponding second symbol position is located within a bottommost row of the symbol-display-portion of the display.

Example 223

The non-transitory computer-readable medium of any of examples 213 to 222, wherein the determined corresponding second symbol position is located adjacent to the corresponding first symbol position.

Example 224

The non-transitory computer-readable medium of any of examples 213 to 223, wherein the corresponding first symbol position and the corresponding second symbol position are located at opposite ends of the symbol-display-portion of the display.

Example 225

The non-transitory computer-readable medium of any of examples 213 to 224, wherein the set of functions further comprises displaying each instance of the particular symbol of the first symbol set moving from the first corresponding symbol position to the second corresponding symbol position.

One or more functions from the set 325 can be performed in accordance with any of examples 1 to 93. One or more of the functions of the set 355 can be performed with any of examples 94 to 186. One or more of the functions of the set 385 can be performed with any of examples 187 to 225.

VI. CONCLUSIONS

While one or more disclosed functions have been described as being performed by certain entities (e.g., machine 100, server machine 100*a*, or client machine 100*b*), one or more of the functions may be performed by any entity, including but not limited to those described herein. As such, while this disclosure includes examples in which the server machine 100*a* performs select functions and sends data to the client machine 100*b*, such that the client machine 100*b* may perform complementing functions and receive the data, variations may to those functions may be made while adhering to the general server-client dichotomy and the scope of the disclosed machines and methods.

For example, rather than the server machine 100*a* sending select data (e.g., a symbol set) to the client machine 100*b*, such that the client machine may generate and display appropriate images, the server machine 100*a* may itself generate the images and send them to the client machine 100*b* for display. Indeed, it will be appreciated by one of ordinary skill in the art that the "break point" between the server machine's functions and the client machine's functions may be varied with ease.

Further, the described functions throughout this application need not be performed in the disclosed order, although in some examples, the recited order may be preferred. Also, not all functions need to be performed to achieve the desired advantages of disclosed machines and methods, and therefore not all functions are required While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

The invention claimed is:

1. A method comprising:

determining, by a processor-controlled machine for a first outcome event, a first symbol set to display within a symbol-display-portion of a display of the processor-controlled machine, wherein the first symbol set includes multiple symbols randomly selected from a global symbol set by a selection for the first outcome event, and wherein the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

displaying, within the symbol-display-portion of the display for the first outcome event, the first symbol set, wherein displaying the first symbol set includes displaying the at least one instance of the particular symbol randomly selected from the global symbol set for the first outcome event and the one or more symbols randomly selected from the global symbol set for the first outcome event other than the particular symbol, and wherein each instance of the particular symbol randomly selected from the global symbol set for the first outcome event is displayed at a corresponding first symbol position within the symbol-display-portion of the display for the first outcome event;

determining, by the processor-controlled machine for a second outcome event occurring after the first outcome event, a second symbol set to display within the symbol-display-portion of the display, wherein the second symbol set includes multiple symbols randomly selected from the global symbol set by a selection for the second outcome event, and wherein the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol;

determining, by the processor-controlled machine for the second outcome event and each instance of the particular symbol randomly selected from the global symbol set for the first outcome event, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

displaying, within the symbol-display-portion of the display for the second outcome event, the second symbol set and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and displaying, on the display for each outcome event of the more than one outcome event, a result indicating whether a payout is earned based at least in part on each instance of the particular symbol randomly selected from the global symbol set for the first outcome event persisting on the display at the corresponding second symbol position for the more than one outcome event after moving from the corresponding first symbol position for the first outcome event.

2. The method of claim 1, wherein the corresponding symbol position is located within the first perimeter column of the symbol-display-portion of the display.

3. The method of claim 2, wherein the corresponding first symbol position is located within a right-most column of the symbol-display-portion of the display.

4. The method of claim 1, wherein the corresponding second symbol position is located within a left-most column of the symbol-display-portion of the display.

5. The method of claim 1, wherein determining, for the second outcome event, for each instance of the particular symbol in the first symbol set, the corresponding second symbol position in the symbol-display-portion of the display comprises:

determining that an instance of the particular symbol occupies a given symbol position within the symbol-display-portion of the display for the first outcome event, wherein the given symbol position is within a common row of the symbol-display-portion of the display with the corresponding first symbol position; and determining the corresponding second symbol position to be a symbol position within the common row of the symbol-display-portion of the display between the first corresponding symbol position and the given symbol position.

6. The method of claim 1, wherein the corresponding first symbol position is located within a first perimeter row of the symbol-display-portion of the display.

7. The method of claim 6, wherein the corresponding first symbol position is located within a top-most row of the symbol-display-portion of the display.

8. The method of claim 1, wherein determining, for the second outcome event, for each instance of the particular symbol in the first symbol set, the corresponding second symbol position in the symbol-display-portion of the display comprises:

determining that an instance of the particular symbol occupies a given symbol position within the symbol-display-portion of the display for the first outcome event, wherein the given symbol position is within a common column of the symbol-display-portion of the display with the corresponding first symbol position; and determining the corresponding second symbol position to be a symbol position within the common column of the symbol-display-portion of the display between the first corresponding symbol position and the given symbol position.

9. The method of claim 1, further comprising displaying each instance of the particular symbol of the first symbol set moving from the first corresponding symbol position to the second corresponding symbol position.

10. The method of claim 1, further comprising:

determining, for the second outcome event, a second symbol set, based on the first symbol set, wherein the second symbol set includes a number of instances of symbols equal to a number of instances of symbols of the first symbol set less a number of instances of the particular symbol of the first symbol set.

11. The method of claim 1, further comprising:

determining, for a given outcome event, that a given column of the symbol-display-portion of the display contains, at least one instance of a symbol that is not the particular symbol; and displaying, for a subsequent outcome event, each given instance of the particular symbol displayed within the given column at a symbol position that the given instance of the particular symbol occupied during the given outcome event.

12. The method of claim 1, further comprising:

determining, for a given outcome event, that a given column of the symbol-display-portion of the display is occupied, at every symbol position of the given column, by instances of the particular symbol;

determining a payout amount for the given outcome event; and causing, for a subsequent outcome event, the instances of the particular symbol occupying the given column to be removed from the display.

13. The method of claim 1, further comprising:

determining, for a given outcome event, that a given row of the symbol-display-portion of the display contains, at least one instance of a symbol that is not the particular symbol and at least one instance of the particular symbol; and displaying, for a subsequent outcome event, each instance of the particular symbol contained within the given row at a symbol position the instance of the particular symbol occupied during the given outcome event.

14. The method of claim 1, further comprising:

determining, for a given outcome event, that a given row of the symbol-display-portion of the display is occupied, at every symbol position of the given row, by instances of the particular symbol;

determining a payout amount for the given outcome event; and causing, for a subsequent outcome event, the instances of the particular symbol occupying the given row to be removed from the display.

15. A method according to claim 1, wherein the global symbol set is identical for both the first outcome event and the second outcome event.

16. A method according to claim 1, wherein:

each instance of the particular symbol randomly selected from the global symbol set for the second outcome event is displayed at a corresponding first symbol position within the symbol-display-portion of the display for the second outcome event; and the method further comprises:

determining, by the processor-controlled machine for a third outcome event occurring after the second outcome event, a third symbol set to display within the symbol-display-portion of the display, wherein the third symbol set includes multiple symbols randomly selected from the global symbol set by a selection for the third outcome event;

determining, by the processor-controlled machine for the third outcome event, for each instance of the particular symbol randomly selected from the global symbol set for the second outcome event, a corresponding second symbol position in the symbol-display-portion of the display other than the corresponding second symbol position in the symbol-display-portion of the display where the particular symbol randomly selected from the global symbol set for the first outcome event is to persist for one or more outcome events after the first outcome event; and displaying, within the symbol-display-portion of the display for the third outcome event:

the third symbol set, each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, and each instance of the particular symbol randomly selected from the global symbol set for the second outcome event at the corresponding second symbol position in the symbol-display-portion of the display other than the corresponding second symbol position in the symbol-display-portion of the display where the particular symbol randomly selected from the global symbol set for the first outcome event is to persist for one or more outcome events after the first outcome event.

17. The method of claim 1, further comprising:

displaying, within the symbol-display-portion of the display for an intervening outcome event occurring between the first outcome event and the second outcome event, a further symbol set and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

the symbol-display-portion of the display includes a quantity of symbol positions equal to a particular number, a respective quantity of symbols displayed in the symbol-display-portion of the display for the first outcome event, the second outcome event, and the intervening outcome event is to the particular number, the further symbol set includes a quantity of symbols equal to a difference of the particular number and a quantity of each instance of the particular symbol randomly selected from the global symbol set for the first outcome event, and the further symbol set does not include any instance of the particular symbol.

18. The method of claim 1, wherein:

the symbol-display-portion is arranged as a matrix including multiple columns and multiple rows and a symbol position at each intersection of a column and row of the matrix, the multiple columns include a left-most column, a right-most column and at least one intervening column between the left-most column and the right-most column, and (i) the corresponding first symbol position is located within the right-most column and the corresponding second symbol position is located within the left-most column, wherein the second perimeter column is the left-most column, or (ii) the corresponding first symbol position is located within the left-most column and the corresponding second symbol position is located within the right-most column, wherein the second perimeter column is the right-most column.

19. A machine comprising:

a display configured to display symbols for an outcome event;

a processor; and a non-transitory computer readable medium storing program instructions, that when executed by the processor, cause a set of functions to be performed, the set of functions comprising:

determining, by the processor for a first outcome event, a first symbol set to display within a symbol-display-portion of the display, wherein the first symbol set includes multiple symbols randomly selected from a global symbol set by a selection for the first outcome event, and wherein the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

displaying, within the symbol-display-portion of the display for the first outcome event, the first symbol set, wherein displaying the first symbol set includes displaying the at least one instance of the particular symbol randomly selected from the global symbol set for the first outcome event and the one or more symbols randomly selected from the global symbol set for the first outcome event other than the particular symbol, and wherein each instance of the particular symbol randomly selected from the global symbol set for the first outcome event is displayed at a corresponding first symbol position within the symbol-display-portion of the display for the first outcome event;

determining, by the processor for a second outcome event occurring after the first outcome event, a second symbol set to display within the symbol-display-portion of the display, wherein the second symbol set includes multiple symbols randomly selected from the global symbol set by a selection for the second outcome event, and wherein the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol;

determining, by the processor for the second outcome event and each instance of the particular symbol randomly selected from the global symbol set for the first outcome event, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

displaying, within the symbol-display-portion of the display for the second outcome event, the second symbol set and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and displaying, on the display for each outcome event of the more than one outcome event, a result indicating whether a payout is earned based at least in part on each instance of the particular symbol randomly selected from the global symbol set for the first outcome event persisting on the display at the corresponding second symbol position for the more than one outcome event after moving from the corresponding first symbol position for the first outcome event.

20. A method comprising:

determining, by a server machine for a first outcome event, a first symbol set to display within a symbol-display-portion of a display of a client machine, wherein the first symbol set includes multiple symbols randomly selected from a global symbol set by a selection for the first outcome event, and wherein the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

sending, by a communication interface of the server machine to the client machine for the first outcome event, first data, wherein the first data indicates to display within the symbol-display-portion of the display for the first outcome event:

the first symbol set, the at least one instance of the particular symbol randomly selected from the global symbol set for the first outcome event, and the one or more symbols randomly selected from the global symbol set for the first outcome event other than the particular symbol, and wherein the first data indicates to display each instance of the particular symbol randomly selected from the global symbol set for the first outcome event at a corresponding first symbol position within the symbol-display-portion of the display for the first outcome event;

determining, by the server machine for a second outcome event occurring after the first outcome event, a second symbol set to display within the symbol-display-portion of the display, wherein the second symbol set includes multiple symbols randomly selected from the global symbol set by a selection for the second outcome event, and wherein the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol;

determining, by the server machine for the second outcome event and each instance of the particular symbol randomly selected from the global symbol set for the first outcome event, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

sending, by the communication interface of the server machine to the client machine for the second outcome event, second data, wherein the second data indicates to display within the symbol-display-portion of the display for the second outcome event:

the second symbol set, and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and sending, by the communication interface of the server machine to the client machine for each outcome event of the more than one outcome event, a result to be displayed on the display, the result indicating whether a payout is earned based at least in part on each instance of the particular symbol persisting on the display at the corresponding second symbol position for each outcome event of the more than one outcome event after moving from the corresponding first symbol position for the first outcome event.

21. A server machine comprising:

a processor;

a communication interface; and a non-transitory computer readable medium storing program instructions, that when executed by the processor, cause a set of functions to be performed, the set of functions comprising:

determining, by the processor for a first outcome event, a first symbol set to display within a symbol-display-portion of a display of a client machine, wherein the first symbol set includes multiple symbols randomly selected from a global symbol set by a selection for the first outcome event, and wherein the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

sending, by the communication interface to the client machine for the first outcome event, first data, wherein the first data indicates to display within the symbol-display-portion of the display for the first outcome event:

the first symbol set, the at least one instance of the particular symbol randomly selected from the global symbol set for the first outcome event, and the one or more symbols randomly selected from the global symbol set for the first outcome event other than the particular symbol, and wherein the first data indicates to display each instance of the particular symbol randomly selected from the global symbol set for the first outcome event at a corresponding first symbol position within the symbol-display-portion of the display for the first outcome event;

determining, by the processor for a second outcome event occurring after the first outcome event, a second symbol set to display within the symbol-display-portion of the display, wherein the second symbol set includes multiple symbols randomly selected from the global symbol set by a selection for the second outcome event, and wherein the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol;

determining, by the server machine for the second outcome event and each instance of the particular symbol in the first symbol set, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

sending, by the communication interface to the client machine for the second outcome event, second data, wherein the second data indicates to display within the symbol-display-portion of the display for the second outcome event:

the second symbol set, and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and sending, by the communication interface of the server machine to the client machine for each outcome event of the more than one outcome event, a result to be displayed on the display, the result indicating whether a payout is earned based at least in part on each instance of the particular symbol persisting on the display at the corresponding second symbol position for each outcome event of the more than one outcome event after moving from the corresponding first symbol position for the first outcome event.

22. A method comprising:

receiving, by a client machine for a first outcome event, first data for displaying a first symbol set within a symbol-display-portion of a display of the client machine, wherein:

the first symbol set includes multiple symbols randomly selected from a global symbol set by a selection for the first outcome event, and the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

displaying, within the symbol-display-portion of the display for the first outcome event based on the first data, the first symbol set, wherein displaying the first symbol set includes displaying the at least one instance of the particular symbol randomly selected from the global symbol set for the first outcome event and the one or more symbols randomly selected from the global symbol set for the first outcome event other than the particular symbol, and wherein each instance of the particular symbol randomly selected from the global symbol set for the first outcome event is displayed at a corresponding first symbol position within the symbol-display-portion of the display for the first outcome event;

receiving, by the client machine for a second outcome event occurring after the first outcome event, second data for displaying a second symbol set within a symbol-display-portion of a display of the client machine, wherein:

the second symbol set includes multiple symbols randomly selected from the global symbol set by a selection for the second outcome event, the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol, and the second data indicates for the second outcome event and each instance of the particular symbol randomly selected from the global symbol set for the first outcome event, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

displaying, within the symbol-display-portion of the display for the second outcome event based on the second data, the second symbol set and each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and displaying, on the display for each outcome event of the more than one outcome event, a result received by the client machine from a server machine, the result indicating whether a payout is earned based at least in part on each instance of the particular symbol randomly selected from the global symbol set for the first outcome event persisting on the display at the corresponding second symbol position for the more than one outcome event after moving from the corresponding first symbol position for the first outcome event.

23. A client machine comprising:

a display configured to display symbols for an outcome event;

a processor;

a communication interface; and a non-transitory computer readable medium storing program instructions, that when executed by the processor, cause a set of functions to be performed, the set of functions comprising:

receiving, by the communication interface for a first outcome event, first data for displaying a first symbol set within a symbol-display-portion of the display, wherein:

the first symbol set includes multiple symbols randomly selected from a global symbol set by a selection for the first outcome event, and the multiple symbols randomly selected from the global symbol set by the selection for the first outcome event include:

at least one instance of a particular symbol randomly selected from the global symbol set for the first outcome event, and one or more symbols randomly selected from the global symbol set for the first outcome event other than the particular symbol;

displaying, within the symbol-display-portion of the display for the first outcome event based on the first data, the first symbol set, wherein displaying the first symbol set includes displaying the at least one instance of the particular symbol randomly selected from the global symbol set for the first outcome event and the one or more symbols randomly selected from the global symbol set for the first outcome event other than the particular symbol, and wherein each instance of the particular symbol randomly selected from the global symbol set for the first outcome event is displayed at a corresponding first symbol position within the symbol-display-portion of the display for the first outcome event;

receiving, by the communication interface for a second outcome event occurring after the first outcome event, second data for displaying a second symbol set within a symbol-display-portion of a display of the client machine, wherein:

the second symbol set includes multiple symbols randomly selected from the global symbol set by a selection for the second outcome event, the multiple symbols randomly selected from the global symbol set by the selection for the second outcome event include:

at least one instance of the particular symbol randomly selected from the global symbol set for the second outcome event, and one or more symbols randomly selected from the global symbol set for the second outcome event other than the particular symbol, and the second data indicates for the second outcome event and each instance of the particular symbol randomly selected from the global symbol set for the first outcome event, a corresponding second symbol position in the symbol-display-portion of the display where the particular symbol randomly selected from the global symbol set for the first outcome event is to persist for one or more outcome events after the first outcome event and that is different than the corresponding first symbol position within the symbol-display-portion of the display for the first outcome event, wherein the corresponding second symbol position is located within a second perimeter column of the symbol-display-portion of the display, and wherein the symbol-display-portion of the display includes a first perimeter column and the second perimeter column;

displaying, within the symbol-display-portion of the display for the second outcome event based on the second data, the second symbol set and, each instance of the particular symbol randomly selected from the global symbol set for the first outcome event at the corresponding second symbol position in the symbol-display-portion of the display where the particular symbol randomly selected from the global symbol set for the first outcome event is to persist for one or more outcome events after the first outcome event, wherein:

displaying the second symbol set includes displaying:

at least one instance of the particular symbol randomly selected from the global symbol set for the second outcome event, and one or more symbols randomly selected from the global symbol set for the second outcome event other than the particular symbol, at least some of the one or more symbols randomly selected from the global symbol set for the second outcome event other than the particular symbol are:

different than the one or more symbols randomly selected from the global symbol set for the first outcome event other than the particular symbol, or identical to at least some of the one or more symbols selected from the global symbol set for the first outcome event other than the particular symbol, but are displayed at a different symbol position within the symbol-display-portion of the display for the second outcome event, and a non-transitory computer-readable medium stores data or a data structure which tracks a symbol position of each instance of the particular symbol that is moved from the corresponding first symbol position to a corresponding second symbol position and data that indicates an instance of the particular symbol is to persist on the display for more than one outcome event after the first outcome event; and displaying, on the display for each outcome event of the more than one outcome event, a result received by the client machine from a server machine, the result indicating whether a payout is earned based at least in part on each instance of the particular symbol randomly selected from the global symbol set for the first outcome event persisting on the display at the corresponding second symbol position for the more than one outcome event after moving from the corresponding first symbol position for the first outcome event.

* * * * *